US008435676B2

(12) United States Patent
Zhamu et al.

(10) Patent No.: US 8,435,676 B2
(45) Date of Patent: May 7, 2013

(54) MIXED NANO-FILAMENT ELECTRODE MATERIALS FOR LITHIUM ION BATTERIES

(75) Inventors: Aruna Zhamu, Centerville, OH (US); Bor Z. Jang, Centerville, OH (US)

(73) Assignee: NanoteK Instruments, Inc., Dayton, OH (US)

( * ) Notice: Subject to any disclaimer, the term of this patent is extended or adjusted under 35 U.S.C. 154(b) by 92 days.

(21) Appl. No.: 12/008,118

(22) Filed: Jan. 9, 2008
(Under 37 CFR 1.47)

(65) Prior Publication Data
US 2009/0176159 A1 Jul. 9, 2009

(51) Int. Cl.
*H01M 4/58* (2010.01)
*H01M 4/02* (2006.01)

(52) U.S. Cl.
USPC ............... 429/231.8; 429/209; 429/218.1; 429/222; 429/225; 429/231

(58) Field of Classification Search ........... 429/222, 429/218.1, 225, 231, 231.8, 209
See application file for complete search history.

(56) References Cited

U.S. PATENT DOCUMENTS

| | | | |
|---|---|---|---|
| 5,344,726 A | 9/1994 | Tanaka et al. | |
| 5,635,151 A | 6/1997 | Zhang et al. | |
| 5,908,715 A | 6/1999 | Liu et al. | |
| 5,965,296 A | 10/1999 | Nishimura et al. | |
| 6,007,945 A | 12/1999 | Jacobs et al. | |
| 6,040,092 A | 3/2000 | Yamada et al. | |
| 6,087,043 A | 7/2000 | Tossici et al. | |
| 6,143,448 A | 11/2000 | Fauteux et al. | |
| 6,316,143 B1 | 11/2001 | Foster et al. | |
| 6,524,744 B1 | 2/2003 | Clerc et al. | |
| 6,858,318 B2 | 2/2005 | Kogiso et al. | |
| 6,872,330 B2 | 3/2005 | Mack et al. | |
| 7,094,499 B1 | 8/2006 | Hung | |
| 2005/0058896 A1* | 3/2005 | Nomura et al. | 429/142 |
| 2005/0271574 A1* | 12/2005 | Jang et al. | 423/448 |
| 2006/0049101 A1 | 3/2006 | Suib et al. | |
| 2006/0216603 A1 | 9/2006 | Choi | |
| 2006/0237697 A1 | 10/2006 | Kosuzu et al. | |
| 2006/0263689 A1 | 11/2006 | Ishihara et al. | |
| 2007/0020519 A1 | 1/2007 | Kim et al. | |
| 2007/0031730 A1 | 2/2007 | Kawakami et al. | |
| 2007/0122701 A1 | 5/2007 | Yamaguchi | |
| 2007/0148544 A1 | 6/2007 | Le | |
| 2008/0286656 A1* | 11/2008 | Cho et al. | 429/231.95 |
| 2008/0292789 A1* | 11/2008 | Sun et al. | 427/216 |

OTHER PUBLICATIONS

Chan et al., "High Capacity Li Ion Battery Anodes Using Ge Nanowires", Nano Lett., vol. 8, No. 1, pp. 307-309, 2008.*
Hu et al., "Controlled growth and electrical properties of heterojunctions of carbon nanotubes and silicon nanowires", Nature 399, 48-51, 1999.*
Stankovich et al., "Graphene-based composite materials", Nature, vol. 442, pp. 282-286, 2006.*

K.P. De Jong and J.W. Geus, Carbon nanofibers: catalytic synthesis and applications, Catal Rev., 42 (2000), pp. 481-510.
D. Takagi, Y. Homma, H. Hibino, S. Suzuki and Y. Kobayashi, Single-walled carbon nanotube growth from highly activated metal nanoparticles, Nano Letter, 6 (2006) 2642-45.
K. W. Kolasinski, "Catalytic growth of nanowires," Current Opinion in Solid State and Materials Science, 10 (2006) pp. 182-191.
F.D. Wang, A.G. Dong, J.W. Sun, R. Tang, H. Yu and W.E. Buhro, Solution-liquid-solid growth of semiconductor nanowires, Inorg Chem., 45 (2006) pp. 7511-7521.
E.C. Walter, et al., "Electrodeposition of Portable Metal Nanowire Arrays," in Physical Chem. of Interfaces and Nanomater, Eds. J. Zhang, et al. Proc. SPIE 2002, 9 pages.
C. K. Chan, et al., "High-Performance Lithium Battery Anodes Using Silicon Nanowires," Nature Nanotechnology, published online Dec. 16, 2007, 5 pages.
J.M. Deitzel, et al, "The Effect of Processing Variables on the Morphology of Electro-spun Nano-fibers and Textiles," Polymer 42 (2001) pp. 261-272.
A.F. Spivak, Y.A. Dzenis and D.H. Reneker, "A Model of Steady State Jet in the Electro-spinning Process," Mech. Res. Commun. 27 (2000) pp. 37-42.
I. D. Norris, et al., "Electrostatic Fabrication of Ultrafine Conducting Fibers: Polyaniline/Polyethylene oxide Blends," Synthetic Metals, 114 (2000) 109-114.
S. Ohara, et al., "Li Insertion/Extraction Reaction at a Si Film Evaporated on a Ni Foil," J. Power Source, 119-121 (2003) 591-596.
W. C. West, et al., "Electrodeposited Amorphous Manganese Oxide Nanowire Arrays for High Energy and Power Density Electrodes," J. Power Source, 126 (2004) 203-206.
C. J. Patrissi, et al, "Sol-Gel-Based Template Synthesis and Li Insertion Rate Performance of Nanostructured V2O5," J. Electrochem. Soc., 146 (9) (1999) 3176-3180.
C. J. Patrissi, et al. "Improving the Volumetric Energy Densities of Nanostructured V2O5 Electrodes," J. of Electrochem. Soc., 148 (11) (2001) A1247-A1253.

(Continued)

*Primary Examiner* — Patrick Ryan
*Assistant Examiner* — Ladan Mohaddes
(74) *Attorney, Agent, or Firm* — Thompson Hine

(57) ABSTRACT

This invention provides a mixed nano-filament composition for use as an electrochemical cell electrode. The composition comprises: (a) an aggregate of nanometer-scaled, electrically conductive filaments that are substantially interconnected, intersected, or percolated to form a porous, electrically conductive filament network, wherein the filaments have a length and a diameter or thickness with the diameter/thickness less than 500 nm (preferably <100 nm) and a length-to-diameter or length-to-thickness aspect ratio greater than 10; and (b) Multiple nanometer-scaled, electro-active filaments comprising an electro-active material capable of absorbing and desorbing lithium ions wherein the electro-active filaments have a diameter or thickness less than 500 nm (preferably <100 nm). The electro-active filaments (e.g., nanowires) and the electrically conductive filaments (e.g., carbon nano fibers) are mixed to form a mat-, web-, or porous paper-like structure in which at least an electro-active filament is in electrical contact with at least an electrically conductive filament. Also provided is a lithium ion battery comprising such an electrode as an anode or cathode, or both. The battery exhibits an exceptionally high specific capacity, an excellent reversible capacity, and a long cycle life.

24 Claims, 17 Drawing Sheets

OTHER PUBLICATIONS

C. R. Sides, et al. "A High-Rate, Nanocomposite LiFePO4/Carbon Cathode," Electrochemical and Solid State Letters, 8 (9) (2005) A484-A487.

S. Yang, et al., "Anodes for Lithium Batteries: Tin Revisited," Electrochemistry Communications, 5 (2003) 587-590.

R.S. Wagner and W.C. Ellis, Vapor-liquid-solid mechanism of single crystal growth, Appl Phys Letter, 4 (1964), pp. 89-90.

S. Bourderau, T. Brousse, and D. M. Schleich, J. Power Source, 81-82 (1999) 233.

J. Jung, M. Park, Y. Yoon, K. Kim, and S. Joo, J. Power Sources, 115 (2003) 346.

U.S. Appl. No. 11/509,424, filed Aug. 25, 2006, B. Z. Jang, et al.
U.S. Appl. No. 11/526,489, filed Sep. 26, 2006, B. Z. Jang, et al.
U.S. Appl. No. 11/709,274, filed Feb. 22, 2007, B. Z. Jang, et al.
U.S. Appl. No. 11/787,442, filed Apr. 17, 2007, A. Zhamu, et al.
U.S. Appl. No. 11/800,728, filed May 8, 2007, A. Zhamu, et al.

T. Takamura, et al., "A Vacuum Deposited Si Film Having a Li Extraction Capacity Over 2000 mAh/g with a Long Cycle Life," J. Power Source, 129 (2004) 96-100.

M. Uehara, et al., "Thick Vacuum Deposited Silicon Films Suitable for the Anode of Li-ion Battery," J. Power Source, 146 (2005) 441-444.

S. Ohara, et al., "A Thin Film Silicon Anode for Li-ion Batteries Having a very Large Specific Capacity and a Long Cycle Life," J. Power Source, 136 (2004) 303-306.

J. Niu, et al "Improvement of Usable Capacity and Cyclability of Si-Based Anode Mater. for Li Batt. by Sol-Gel Graphite," Electrochem & Solid-State Letters, 5(6) (2002) A107.

T. L. Kulova, et al., "Lithium Insertion into Amorphous Silicon Thin-Film Electrodes," J. Electroanalytical Chemistry, 600 (2007) 217-225.

H. J. Jung, et al., "Amorphous Silicon Anode for Lithium-Ion Rechargeable Batteries," J. Power Source, 115 (2003) 346-351.

K. L. Lee, et al., "Electrochemical Characteristics of a-Si Thin Film Anode for Li-ion Rechargeable Batteries," J. Power Source, 129 (2004) 270-274.

C. J. Kim, et al., "Critical Size of a Nano $SnO_2$ Electrode for Li-Secondary Battery," Chem., Mater., 17 (2005) 3297-3301.

J. Read, et al., "$SnO_2$-Carbon Composites for Lithium-Ion Battery Anode," J. Power Source, 96 (2001) 277-281.

L. Yuan, et al., "Nano-structured $SnO_2$-Carbon Composites Obtained by in-situ Spray Pyrolysis Method as Anodes in Lithium Batteries," J. Power Source, 146 (2005) 180-184.

* cited by examiner

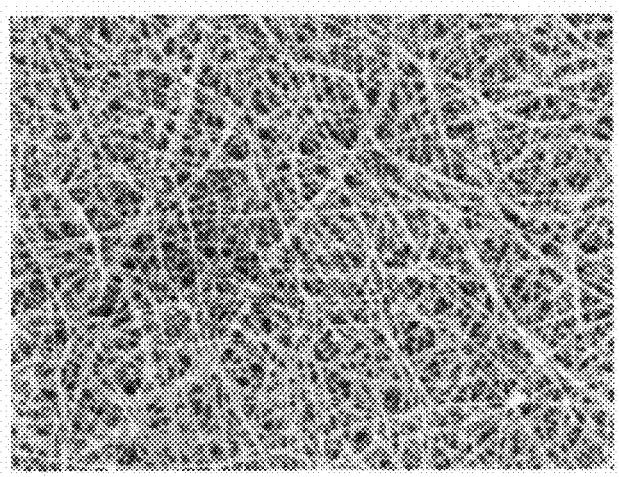
FIG. 6(A)  200 nm
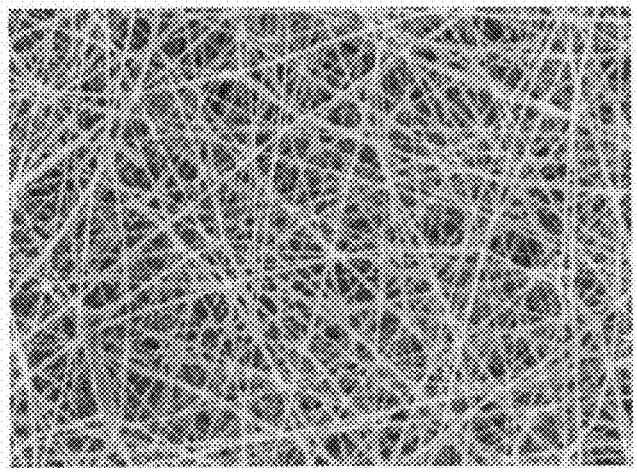
FIG. 6(B)  150 nm

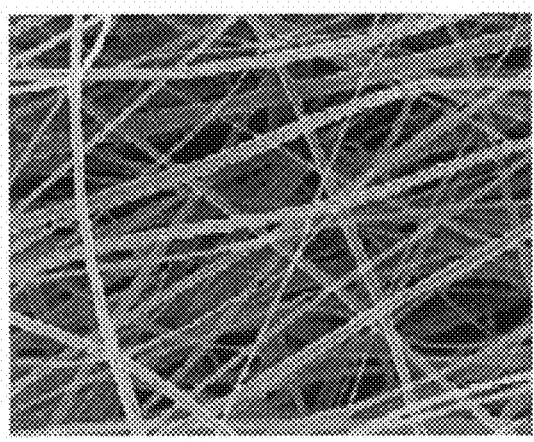
FIG. 7 __100 nm 500 nm

MIXED NANO-FILAMENT ELECTRODE MATERIALS FOR LITHIUM ION BATTERIES

This is a co-pending application of (a) Aruna Zhamu, "NANO GRAPHENE PLATELET-BASED COMPOSITE ANODE COMPOSITIONS FOR LITHIUM ION BATTERIES," U.S. patent application Ser. No. 11/982,672 (Nov. 5, 2007) and (b) Aruna Zhamu and Bor Z. Jang, "HYBRID ANODE COMPOSITIONS FOR LITHIUM ION BATTERIES," U.S. patent application Ser. No. 11/982,662 (Nov. 5, 2007).

FIELD OF THE INVENTION

The present invention provides an electrode material composition for a secondary or rechargeable battery, particularly lithium-ion battery. The material, depending upon the actual chemical composition, can be used as either an anode or a cathode active material. In either application, the material comprises a mixture of at least one electrically conductive nano-scaled filamentary material and an electro-chemically active, nano-scaled filamentary material (e.g., nanowires).

BACKGROUND

The description of prior art will be primarily based on the list of references presented at the end of this section.

Concerns over the safety of earlier lithium secondary batteries led to the development of lithium ion secondary batteries, in which pure lithium metal sheet or film was replaced by carbonaceous materials as the anode. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g [Ref. 1].

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode material has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, for the anodes composed of these materials, pulverization (fragmentation of the alloy particles or thin films) proceeds with the progress of the charging and discharging cycles due to expansion and contraction of the anode during the absorption and desorption of the lithium ions. The expansion and contraction also tend to result in reduction in or loss of particle-to-particle contacts or contacts between the anode material and its current collector. These adverse effects result in a significantly shortened charge-discharge cycle life.

To overcome the problems associated with such mechanical degradation, several approaches have been proposed, including (a) using nano-scaled particles of an anode active material, (b) composites composed of small electrochemically active particles supported by less active or non-active matrices or coatings, and (c) metal alloying [e.g., Refs. 2-13]. Examples of active particles are Si, Sn, and $SnO_2$. However, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

For instance, as disclosed in U.S. Pat. No. 6,007,945 [Ref. 3], a solid solution of titanium dioxide and tin dioxide was utilized as the anode active substance in the negative electrode of a rechargeable lithium battery. The density of the negative electrode made was 3.65 $g/cm^3$, and the reversible capacity of the negative electrode containing $TiO_2$—$SnO_2$ in a ratio of 39:61 by weight, was found to be 1130 $mAh/cm^3$. This was equivalent to 309.6 mAh/g, although the obtained rechargeable lithium battery was calculated to have energy density of 207 watt-hour per liter. Furthermore, the nano particles of the anode material react with the electrolyte during the charge-discharge cycles, resulting in reduced long-term utility.

As described in U.S. Pat. No. 6,143,448 [Ref. 4], a composite was formed by mixing carbon with a metal salt in water, followed by evaporation, heating, and further treatment. The process produces a composite with many pores, which are not always preferred. The best achievable capacity was reported to be in the range of 750-2,000 $mAh/cm^3$. With a density of 4 $g/cm^3$, this implies a maximum capacity of 500 mAh/g In U.S. Pat. No. 7,094,499 [Ref. 5], Hung disclosed a method of forming a composite anode material. The steps include selecting a carbon material as a constituent part of the composite, chemically treating the selected carbon material to receive nano particles, incorporating nano particles into the chemically treated carbon material, and removing surface nano particles from an outside surface of the carbon material with incorporated nano particles. A material making up the nano particles forms an alloy with lithium. The resulting carbon/nano particle composite anodes did not exhibit any significant increase in capacity, mostly lower than 400 mAh/g.

Clerc, et al., in U.S. Pat. No. 6,524,744 [Ref. 6], proposed a multiphase material that comprises a ceramic matrix material having one or more of Sn, Sb, Bi, Pb, Ag, In, Si and Ge nano-dispersed in the matrix. The ceramic matrix is based upon carbides, nitrides and oxides of group IV-VI transition metals taken singly or in combination. The lattice structure of this matrix provides good mechanical and chemical stability, serving to inhibit migration of metal domains. As a result, cells incorporating these materials manifest very low first cycle losses. However, it seems that this approach would require a large fraction of a high-density ceramic matrix, hence would significantly reduce the specific capacity (per unit anode weight).

In summary, the prior art has not demonstrated a composite material that has all or most of the properties desired for use in an anode for the lithium-ion battery. Thus, there is a need for a new anode for lithium-ion batteries that has a high cycle life, high reversible capacity, and low irreversible capacity. There is also a need for a method of readily or easily producing such a material.

It may be further noted that the cathode materials used in the prior art Li ion batteries are not without issues. As a matter of fact, a practical specific capacity of a cathode material has been, at the most, up to 200 mAh/g, based on per unit weight of the cathode material. The positive electrode active material is typically selected from a wide variety of lithium-containing or lithium-accommodating oxides, such as manganese dioxide, manganese composite oxide, nickel oxide, cobalt oxide, nickel cobalt oxide, iron oxide, vanadium oxide, and iron phosphate. The positive electrode active material may also be selected from chalcogen compounds, such as titanium disulfate or molybdenum disulfate. These prior art materials do not offer a high lithium insertion capacity and this capacity also tends to decay rapidly upon repeated charging and discharging. In many cases, this capacity fade may be ascribed to a loss of electrical contact of the cathode active material particles with the cathode current collector.

In most of the prior art cathodes, a significant amount of a conductive material, such as acetylene black, carbon black, or ultra-fine graphite particles, must be used to improve the electrical connection between the cathode active material (typically in a fine powder form) and a current collector (e.g., Al or Cu foil). Additionally, a binder is normally required to bond the constituent particles of both the cathode active material and the conductive additive for forming an integral cathode body. The binder is typically selected from polytetrafluoroethylene (PTFE), polyvinylidene fluoride (PVDF), ethylene-propylene-diene copolymer (EPDM), or styrene-butadiene rubber (SBR), for example. A typical mixing ratio of these ingredients is 75 to 90% by weight for the positive electrode active material, 5 to 20% by weight for the conductor agent, and approximately 5% by weight for the binder. This implies that the cathode typically contains a significant proportion of non-electro-active materials that do not contribute to the absorption and extraction of Li ions.

In addition to these two issues, conventional cathode materials also have many of the aforementioned problems associated with the anode materials. Therefore, a further need exists for a cathode active material that has a high specific capacity, a minimal irreversible capacity (low decay rate), and a long cycle life.

REFERENCES

1. Zhang, et al., "Carbon Electrode Materials for Lithium Battery Cells and Method of Making Same," U.S. Pat. No. 5,635,151 (Jun. 3, 1997).
2. Liu, et al., "Composite Carbon Materials for Lithium Ion Batteries, and Method of Producing Same," U.S. Pat. No. 5,908,715 (Jun. 1, 1999).
3. Jacobs, et al, U.S. Pat. No. 6,007,945 (Dec. 28, 1999).
4. Fauteux, et al., U.S. Pat. No. 6,143,448 (Nov. 7, 2000).
5. C. C. Hung, "Carbon Materials Metal/Metal Oxide Nanoparticle Composite and Battery Anode Composed of the Same, U.S. Pat. No. 7,094,499 (Aug. 22, 2006).
6. D. Clerc, et al., "Multiphase Material and Electrodes Made Therefrom," U.S. Pat. No. 6,524,744 (Feb. 25, 2003).
7D. L. Foster, et al, "Electrode for Rechargeable Lithium-Ion Battery and Method for Fabrication," U.S. Pat. No. 6,316,143 (Nov. 13, 2001).
8. D. B. Le, "Silicon-Containing Alloys Useful as Electrodes for Lithium-Ion Batteries," US 2007/0148544 (Pub. Jun. 28, 2007).
9. H. Yamaguchi, "Anode Material, Anode and Battery," US 2007/0122701 (Pub. May 31, 2007).
10. S. Kawakami, et al., "Electrode Material for Anode of Rechargeable Lithium Battery," US 2007/0031730 (Pub. Feb. 8, 2007).
11. H. Kim, et al., "Anode Active Material, Manufacturing Method Thereof, and Lithiurm Battery Using the Anode Active Material," US 2007/0020519 (Pub. Jan. 25, 2007).
12. H. Ishihara, "Anode Active Material and Battery," US 2006/0263689 (Pub. Nov. 23, 2006).
13. T. Kosuzu, et al., "Electrode Material for Rechargeable Lithium Battery," US 2006/0237697 (Pub. Oct. 26, 2006).
14. R. S. Wagner and W. C. Ellis, "Vapor-liquid-solid mechanism of single crystal growth," *Appl. Phys Letter*, 4 (1964), pp. 89-90.
15. K. P. De Jong and J. W. Geus, "Carbon nanofibers: catalytic synthesis and applications," *Catal. Rev.*, 42 (2000), pp. 481-510.
16D. Takagi, Y. Homma, H. Hibino, S. Suzuki and Y. Kobayashi, "Single-walled carbon nanotube growth from highly activated metal nanoparticles," *Nano Letter*, 6 (2006), pp. 2642-2645.
17. K. W. Kolasinski, "Catalytic growth of nanowires: Vapor-liquid-solid, vapor-solid-solid, solution-liquid-solid and solid-liquid-solid growth," Current Opinion in Solid State and Materials Science, 10 (2006) pp. 182-191.
18. F. D. Wang, A. G. Dong, J. W. Sun, R. Tang, H. Yu and W. E. Buhro, "Solution-liquid-solid growth of semiconductor nanowires," *Inorg Chem.*, 45 (2006) pp. 7511-7521.
19. E. C. Walter, et al., "Electrodeposition of Portable Metal Nanowire Arrays," in Physical Chemistry of Interfaces and Nanomaterials, Eds. Jin Z. Zhang and Zhong L. Wang, Proc. SPIE 2002, 9 pages.
20. M. Kogiso and T. Shimizu, "Metal Nanowire and Process for Producing the Same," U.S. Pat. No. 6,858,318 (Feb. 22, 2005).
21. C. K. Chan, et al., "High-Performance Lithium Battery Anodes Using Silicon Nanowires," Nature Nanotechnology, published online 16 Dec. 2007, 5 pages.
22. J. J. Mack, et al., "Chemical Manufacture of Nanostructured Materials," U.S. Pat. No. 6,872,330 (Mar. 29, 2005).
23. Bor Z. Jang, Aruna Zhamu, and Jiusheng Guo, "Process for Producing Nano-scaled Platelets and Nanocomposites," U.S. patent application Ser. No. 11/509,424 (Aug. 25, 2006).
24. Bor Z. Jang, Aruna Zhamu, and Jiusheng Guo, "Mass Production of Nano-scaled Platelets and Products," U.S. patent application Ser. No. 11/526,489 (Sep. 26, 2006).
25. Bor Z. Jang, Aruna Zhamu, and Jiusheng Guo, "Method of Producing Nano-scaled Graphene and Inorganic Platelets and Their Nanocomposites," U.S. patent application Ser. No. 11/709,274 (Feb. 22, 2007).
26. Aruna Zhamu, JinJun Shi, Jiusheng Guo, and Bor Z. Jang, "Low-Temperature Method of Producing Nano-scaled Graphene Platelets and Their Nanocomposites," U.S. patent application Ser. No. 11/787,442 (Apr. 17, 2007).
27. Aruna Zhamu, Jinjun Shi, Jiusheng Guo and Bor Z. Jang, "Method of Producing Exfoliated Graphite, Flexible Graphite, and Nano-Scaled Graphene Plates," U.S. patent application Ser. No. 11/800,728 (May 8, 2007).
28. J. M. Deitzel, J. Kleinmeyer, D. Harris and N. C. Beck Tan, "The Effect of Processing Variables on the Morphology of Electro-spun Nano-fibers and Textiles," *Polymer*, 42 (2001) pp. 261-272.
29. A. F. Spivak, Y. A. Dzenis and D. H. Reneker, "A Model of Steady State Jet in the Electro-spinning Process," *Mech. Res. Commun.* 27 (2000) pp. 37-42.
30. I. D. Norris, et al., "Electrostatic Fabrication of Ultrafine Conducting Fibers: Polyaniline/Polyethylene oxide Blends," Synthetic Metals, 114 (2000) 109-114.

31. W. C. West, et al., "Electrodeposited Amorphous Manganese Oxide Nanowire Arrays for High Energy and Power Density Electrodes," J. Power Source, 126 (2004) 203-206.
32. S. L. Suib, et al., "Manganese Nanowires, Films, and Membranes and Methods of Making," US 2006/0049101 (Mar. 9, 2006).
33. S. H. Choi, "Lithium-Ion Rechargeable Battery Based on Nanostructures," US 2006/0216603 (Sep. 28, 2006).
34. C. J. Patrissi and C. R. Martin, "Sol-Gel-Based Template Synthesis and Li Insertion Rate Performance of Nanostructured Vanadium Pentoxide," J. of The Electrochem. Soc., 146 (9) (1999) 3176-3180.
35. C. J. Patrissi and C. R. Martin, "Improving the Volumetric Energy Densities of Nanostructured $V_2O_5$ Electrodes Prepared Using the Template Method," J. of The Electrochem. Soc., 148 (11) (2001) A1247-A1253.
36. C. R. Sides, et al. "A High-Rate, Nanocomposite $LiFePO_4$/Carbon Cathode," Electrochemical and Solid State Letters, 8 (9) (2005) A484-A487.
37. S. Ohara, et al., "Li Insertion/Extraction Reaction at a Si Film Evaporated on a Ni Foil," J. Power Source, 119-121 (2003) 591-596.
38. T. Takamura, et al., "A Vacuum Deposited Si Film Having a Li Extraction Capacity Over 2000 mAh/g with a Long Cycle Life," J. Power Source, 129 (2004) 96-100.
39. M. Uehara, et al., "Thick Vacuum Deposited Silicon Films Suitable for the Anode of Li-ion Battery," J. Power Source, 146 (2005) 441-444.
40. S. Ohara, et al., "A Thin Film Silicon Anode for Li-ion Batteries Having a very Large Specific Capacity and a Long Cycle Life," J. Power Source, 136 (2004) 303-306.
41. J. Niu and J. Y. Lee, "Improvement of Usable Capacity and Cyclability of Silicon-Based Anode Materials for Lithium Batteries by Sol-Gel Graphite Matrix," Electrochemical and Solid-State Letters, 5(6) (2002) A107-A110.
42. T. L. Kulova, et al., "Lithium Insertion into Amorphous Silicon Thin-Film Electrodes," J. Electroanalytical Chemistry, 600 (2007) 217-225.
43. S. Bourderau, et al., "Amorphous Silicon as a Possible Anode Material for Li-ion Batteries," J. Power Source, 81-82 (1999) 233-236.
44. K. L. Lee, et al., "Electrochemical Characteristics of a-Si Thin Film Anode for Li-ion Rechargeable Batteries," J. Power Source, 129 (2004) 270-274.
45. H. J. Jung, et al., "Amorphous Silicon Anode for Lithium-Ion Rechargeable Batteries," J. Power Source, 115 (2003) 346-351.
46. C. J. Kim, et al., "Critical Size of a Nano $SnO_2$ Electrode for Li-Secondary Battery," Chem., Mater., 17 (2005) 3297-3301.
47. J. Read, et al., "$SnO_2$-Carbon Composites for Lithium-Ion Battery Anode," J. Power Source, 96 (2001) 277-281.
48. L. Yuan, et al., "Nano-structured $SnO_2$-Carbon Composites Obtained by in-situ Spray Pyrolysis Method as Anodes in Lithium Batteries," J. Power Source, 146 (2005) 180-184.
49. S. Yang, et al., "Anodes for Lithium Batteries: Tin Revisited," Electrochemistry Communications, 5 (2003) 587-590.

SUMMARY OF THE INVENTION

The present invention provides a new nano materials platform technology (a versatile, unified approach) that enables the design and production of high-capacity anode and cathode active materials. In a specific embodiment, the invention provides a mixed nano-filament composition for use as an electrochemical cell electrode, either an anode or a cathode. The composition comprises:

a) An aggregate of nanometer-scaled, electrically conductive filaments that are substantially interconnected, intersected, or percolated to form a porous, electrically conductive filament network, wherein the filaments have a length and a diameter (or thickness) with a diameter (or thickness) being less than 500 nm in size (preferably <100 nm) and a length-to-diameter or length-to-thickness aspect ratio greater than 10; and b) Multiple nanometer-scaled, electro-chemically active (abbreviated as "electro-active") filaments comprising therein or thereon an electro-active material capable of absorbing and desorbing lithium ions wherein the electro-active filaments have a diameter or thickness less than 500 nm (preferably <100 nm);

wherein the electro-active filaments and the electrically conductive filaments are mixed to form a mat-, web-, or porous paper-like structure in which at least an electro-active filament is in electrical contact with at least an electrically conductive filament. Preferably, the electro-active filament is electrically connected to conductive filaments at multiple contact points. Further preferably, the electro-active filaments comprise nanowires. The mixed filaments may be bonded to a current collector using a conductive adhesive. Alternatively, some part of the web of conductive filaments may be impregnated with a conductive material to make a composite structure, which will be an integral electrode-collector.

Preferably, multiple conductive filaments are processed to form an aggregate or web, characterized in that these filaments are intersected, overlapped, or somehow bonded to one another to form a network of electron-conducting paths. The aggregate or web has substantially interconnected pores that are intended for accommodating the electrolyte in a battery. The conductive filament may be selected from, as examples, a carbon nano fiber (CNF), graphite nano fiber (GNF), carbon nano-tube (CNT), metal nano wire (MNW), nano-scaled graphene platelet (NGP), metal-coated fibrils, or a combination thereof.

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 μm and 10 μm, but could be longer or shorter. The NGPs, just like other elongate bodies (carbon nano tubes, carbon nano fibers, metal nano wires, etc.), readily overlap one another to form a myriad of electron transport paths for improving the electrical conductivity of the anode. Hence, the electrons generated by the anode active material coating during Li insertion can be readily collected.

The conductive filament is characterized by having an elongate axis (length or largest dimension) and a first transverse dimension (smallest dimension, such as a thickness of an NGP or a diameter of a fiber, tube, or wire) wherein the thickness or diameter is smaller than 500 nm (preferably smaller than 100 nm) and the length-to-diameter or length-to-thickness ratio is no less than 10 (typically much higher than 100). The filament may have a cross-sectional area that is not spherical. In this case, the diameter is taken as the average of the major axis (largest dimension) and the minor axis (smallest dimension). In the case of an NGP, the platelet has a length, a width, and a thickness, wherein the length-to-width ratio is at least 3. Typically, the length-to-thickness ratio of NGPs is much greater than 100.

The electro-active filament may comprise an anode active material or a cathode active material depending on the intended use. The anode active material in the present invention may be selected from the following groups of materials:
  (a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 μm, more preferably thinner than 1 μm, and most preferably thinner than 100 nm;
  (b) The alloys or intermetallic compounds of Si, Ge, Sn, Pb, Sb, Bi, Zn, Al, or Cd, stoichiometric or non-stoichiometric with other elements; and
  (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

The electrochemically active materials listed in (a)-(c) above, when used alone as an anode active material in a particulate or thin film form, have been commonly found to suffer from the fragmentation problem and poor cycling stability. When used in a nano filamentary form (e.g., multiple nanowires) and blended with multiple conductive filaments to form a mixed nano filament web, the resulting anode exhibits a reversible capacity much higher than that of graphite (372 mAh/g), a low irreversible capacity loss, low internal resistance, and fast charge-recharge rates.

The electrochemically active filaments may comprise nanowires of a cathode-active material, such as manganese oxide, cobalt oxide, nickel oxide, vanadium oxide, and lithium iron phosphate ($LiFePO_4$). In this case, the resulting mixed filaments are used as a cathode material.

In another preferred embodiment, the electro-active nanowires may be grown from catalysts seeded on a surface of the conductive filaments. In other words, one end of a nanowire is in physical and electronic contact with a conductive filament, which is ultimately connected to a current collector. Alternatively, conductive filaments (e.g., carbon nano fibers or carbon nano-tubes) may be grown from catalyst-seeded surface of electro-active nanowires. In both cases, the nanowires are naturally connected to the network of electrically conductive filaments at multiple points of contact since electro-active nanowires and electrically conductive filaments are naturally intertwined together to form an integral web or mat.

Another preferred embodiment of the present invention is a lithium secondary battery comprising a positive electrode, a negative electrode, and a non-aqueous electrolyte disposed between the negative electrode and the positive electrode. Either the negative electrode (anode) or the positive electrode (cathode), or both, may comprise a mixed nano-filament composition composed of electrochemically active filaments (nanowires) blended with interconnected conductive filaments.

The presently invented anode and cathode material technology has several major advantages, summarized as follows:
  (1) Some of the electrically conductive filaments (e.g., CNFs, CNTs, and NGPs) may also be anode-active, capable of absorbing and extracting lithium ions. Their roles are not limited to serving as electrical conductors for providing multiple points of electrical contacts.
  (2) During lithium insertion and extraction, the electro-active filament expands and shrinks. The geometry of both the electrochemically active filaments and the electrically conductive elements enables both types of filaments to freely undergo strain relaxation in transverse directions. Being nanometer-scaled, both filaments are of sound structural integrity and do not easily suffer from fracturing during repeated cycles of charging and recharging. The two sets of filaments are intertwined together in such a manner that, upon repeated charging/discharging, they remain in electronic contact with each other. Even when in some cases the nanowires are more brittle and could fracture into segments, the presence of those mechanically tougher conductive filaments could presumably still maintain a contact with these fractured nanowire segments.
  (3) With the active filament diameter or thickness being less than 500 nm (most preferably less than 100 nm), the distance that lithium ions have to travel is short. The anode or cathode can quickly store or release lithium and thus can carry high currents. This superior high-rate performance is a highly beneficial feature for a battery that is intended for high power density applications, such as electric cars and power tools.
  (4) The interconnected network of filaments (schematically shown in FIG. 1(B)) forms a continuous path for electrons, resulting in significantly reduced internal energy loss or internal heating. The electrons produced by the anode active material only have to travel to a nearby point of contact with a conductive filament, after which electron transport is fast. Electrons will rapidly travel down a conductive filament longitudinal axis and be collected by a current collector. This is in contrast to the situation as proposed by Chan, et al [Ref. 21], where multiple Si nanowires were catalytically grown from a current collector surface in a substantially perpendicular direction, as schematically shown in FIG. 1(A). The electrons produced by the Si nanowires (diameter=89 nm) must travel through the complete nanowire length to reach the current collector.
  (5) In the nanowire technology of Chan, et al., each Si nanowire is only connected to a current collector through a very narrow contact area (diameter=89 nm) and, hence, the nanowire would tend to detach from the steel current collector after a few volume expansion-contraction cycles. Furthermore, if fragmentation of a nanowire occurs, only the segment in direct contact with the steel plate could remain in electronic connection with the current collector and all other segments will become ineffective since the electrons generated will not be utilized. In contrast, in the instant invention, the electro-active filaments are intertwined with conductive filaments and, even if an electro-active filament is fractured into separate segments, individual segments would likely remain in physical contact with some points of a conductive filament, which is essentially part of the current collector. The electrons generated can still be collected.
  (6) The anode material in the present invention provides a specific charging capacity that can be as high as 4,200 mAh/g (based on per gram of Si alone). Even when the weight of the filaments is also accounted for, the maximum capacity can still be exceptionally high. Li ion batteries featuring the presently invented mixed nano filament anode or cathode material exhibit superior multiple-cycle behaviors with a minimal capacity fade and a long cycle life.

These and other advantages and features of the present invention will become more transparent with the description of the following best mode practice and illustrative examples.

BRIEF DESCRIPTION OF THE DRAWINGS

FIG. 6(A) Scanning electron micrographs (SEM) of electro-spun PI fibers (PI-0, before carbonization) and (B) c-PI-0 (PI fibers after carbonization).

FIG. 7 A scanning electron micrograph (SEM) image of c-PAN-5.

DETAILED DESCRIPTION OF PREFERRED EMBODIMENTS

This invention provides an innovative material platform that enables a new design of either an anode material or a cathode material for a high-capacity lithium secondary battery, which is preferably a secondary battery based on a non-aqueous electrolyte or a polymer gel electrolyte. The shape of a lithium secondary battery can be cylindrical, square, button-like, etc. The present invention is not limited to any battery shape or configuration.

Figure 1A:
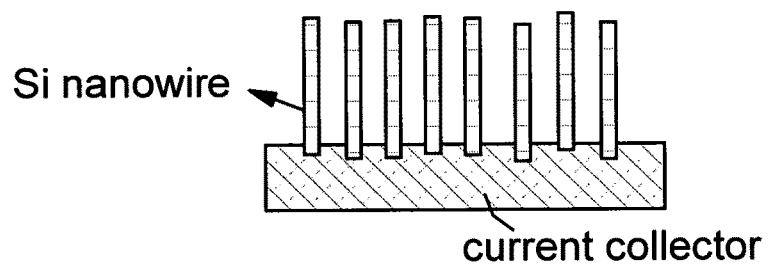
FIG. 1(A) Schematic of a prior art anode composition composed of Si nanowires catalytically grown in a direction normal to a steel current collector according to Chan, et al. [Ref. 21]; (B) Schematic of a web bonded to a current collector, wherein the web comprises networks of interconnected or intersected conductive filaments mixed with electro-active nanowires.
Figure 1B:
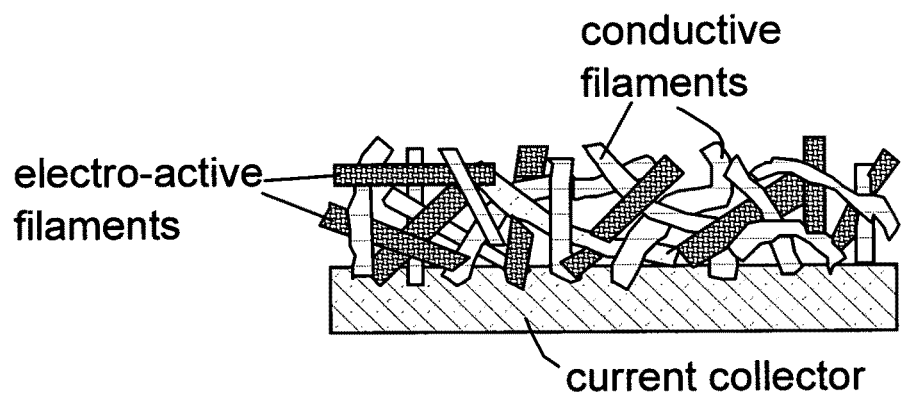
Figure 2:
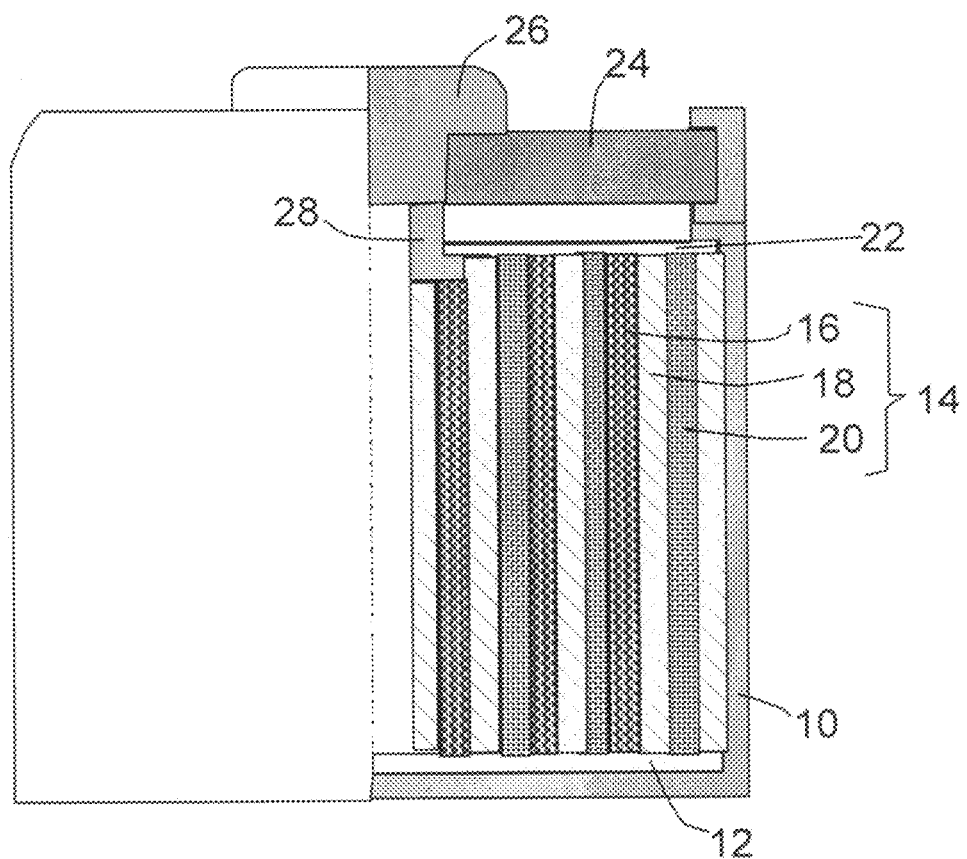
FIG. 2 Schematic of a cylinder-shape lithium ion battery.

As an example, a cylindrical battery configuration is shown in FIG. 2. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

The negative electrode (anode), which the instant invention provides, will be explained first, which will be followed by a description of the material composition for the cathode. As used herein, the term "electrochemically active" is often abbreviated as "electro-active" and can refer to an anode active material or a cathode active material, depending upon the actual case being discussed. An electro-active material refers to a material that is capable of absorbing (e.g. via intercalating) and extracting lithium ions (e.g., via de-intercalating). During the discharge process of a Li ion battery, Li ions are extracted out of an anode and inserting into a cathode. Conversely, during the recharging process, Li ions are extracted out of a cathode and inserted into an anode. Both the anode and the cathode are capable of absorbing and extracting Li ions.

In one preferred embodiment, the mixed nano filament material composition comprises (a) an aggregate of nanometer-scaled, electrically conductive filaments that are substantially interconnected, intersected, or percolated to form a porous, electrically conductive filament network, wherein the filament network comprises substantially interconnected pores and the filaments have an elongate dimension and a first transverse dimension (thickness or diameter) with the first transverse dimension being less than 500 nm (preferably less than 100 nm) and an elongate dimension-to-first transverse dimension aspect ratio being greater than 10; and (b) multiple, nanometer-scaled filaments (e.g., nanowires) that are electrochemically active, capable of absorbing and desorbing lithium ions, and have a diameter or thickness less than 500 nm (preferably less than 100 nm).

As used herein, "nanoscopic-scale," "nanoscopic," "nanometer-scale," "nanoscale," the "nano-" prefix, and the like generally refers to a physical object having a width, thickness, or diameter of less than about 500 nm, and more preferably less than 100 nm. In all embodiments, the filament has a largest dimension (length) and a smallest dimension (diameter or thickness). In a filament with a non-circular or non-elliptic cross-section, there can be a width and a thickness. For instance, a nano filament may have a rectangular cross-section having a width and a thickness (the smaller of the two being the thickness). For an elliptic cross-section or any irregular cross-section, there is a largest dimension (major axis) and a smallest dimension (minor axis). In each case, if the term "diameter" is used, it is intended to refer to the effective diameter, as defined by the average of the major and minor axis of the cross-section of the filament.

One particular class of conductive nano filaments is a nanoscale graphene platelet (NGP), A platelet (e.g., an NGP) may have a length (largest dimension), a thickness (smallest dimension), and a width. Preferred conductive nano filaments for use in the present invention are carbon nano fibers (CNFs), graphitic nano fibers (GNFs), and carbon nano-tubes (CNTs). In each case, the filament has a length typically greater than 1 μm and an average diameter from approximately 1 nm up to about 500 nm. It is to be understood that a small fraction of the conductive filaments herein used may have a diameter greater than 500 nm, but the intention is to have a majority of the conductive filaments thinner than 500 nm.

Another class of nano filaments, electrically conductive or electro-active, is the nanoscopic wire, also herein referred to as the nanoscopic-scale wire, nanoscale wire, or nanowire. At any point along its length, a nanowire has at least one cross-sectional dimension and, in some embodiments, two orthogonal cross-sectional dimensions less than about 500 nm, preferably less than about 200 nm, more preferably less than about 100 nm, and most preferably less than about 50 nm. Where nanoscale wires are described as having a core and an outer region, the above dimensions generally relate to those of the core. The cross-section of the nanoscale wire may have any arbitrary shape, including, but not limited to, circular, square, rectangular, tubular, or elliptical, and may have an irregular shape. For example, ZnO nanowires have a hexagonal cross-section, $SnO_2$ nanowires have a rectangular cross-section, PbSe nanowires have a square cross-section, and Si or Ge nanowires have a circular cross-section. Again, the term "diameter" is intended to refer to the average of the major and minor axis of the cross-section. The nanoscale wire may be solid or hollow. The length of the nanoscale wire is preferably at least 1 μm and more preferably at least 5 μm. The wires should have an aspect ratio (length to diameter) of at least about 2:1, preferably greater than about 10:1, and more preferably greater than about 100:1.

As used herein, a nanotube (e.g. a carbon nanotube) is generally a nanoscopic wire that is hollow, or that has a hollowed-out core, including those nanotubes known to those of ordinary skill in the art. "Nanotube" is abbreviated herein as "NT." Nanotubes and nano rods may be considered as two special classes of small wires for use in the invention.

Preferably, multiple conductive filaments are processed to form an aggregate or web, characterized in that these filaments are intersected, overlapped, or somehow bonded to one another to form a network of electron-conducting paths. Although not a necessary condition, a binder material may be used to bond the filaments together to produce an integral web. The binder material may be a non-conductive material, such as polyvinylidene fluoride (PVDF) and poly(tetrafluoroethylene) (PTFE). However, an electrically conductive binder material is preferred, which can be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline). The aggregate or web has substantially interconnected pores that are intended for accommodating the electrolyte in a battery.

The conductive filaments may be selected from a carbon nano fiber (CNF), graphite carbon fiber (GNF), carbon nano-tube (CNT), metal nano wire (MNW), metal-coated nano fiber, metal nano rod, metal-coated nano rod, nano-scaled graphene platelet (NGP), or a combination thereof. The filament is characterized by having a large length-to-diameter or length-to-thickness aspect ratio to facilitate the formation of a network of electron conductive paths, which may be described as reaching a state of percolation. Percolation can be more readily achieved with a smaller amount of conductive filaments if the length-to-diameter or length-to-thickness aspect ratio is no less than 10, more preferably greater than 100. In the case of an NGP, the platelet has a length, a width, and a thickness, wherein the length-to-thickness ratio is typically much greater than 100 and the length-to-width ratio is preferably at least 3.

Another important property of a conductive filament herein used is high electrical conductivity to enable facile collection of electrons produced by the anode active material (e.g., Si nanowires) with minimal resistance. A low conductivity implies a high resistance and high energy loss, which is undesirable.

In the present application, nano rods primarily refer to elongate solid core structures with diameters below approximately 500 nm. Conventional whiskers are elongate solid core structures typically with a diameter greater than 100 nm. Generally, nano tubes refer to elongate hollow structures thinner than 100 nm. However, for carbon- or graphite-based nano materials, carbon nano tubes (CNTs) specifically refer to hollow-core structures with a diameter smaller than 10 nm. Both hollow-cored and solid-cored carbon- or graphite-based filaments with a diameter greater than 10 nm are commonly referred to as carbon nano fibers (CNFs) or graphite nano fibers (GNFs), respectively. Graphite nano fibers are typically obtained from carbon nano fibers through a heat treatment (graphitization) at a temperature greater than 2,000° C., more typically greater than 2,500° C.

Catalytic growth is a powerful tool to form a variety of wire- or whisker-like structures with diameters ranging from just a few nanometers to the micrometer range. A range of phases (gas, solid, liquid, solution, and supercritical fluid) have been used for the feeder phase, i.e. the source of material to be incorporated into the nano-wire. The history of catalytic growth of solid structures is generally believed to begin with the discovery of Wagner and Ellis [Ref. 14] that Si whiskers or wires could be grown by heating a Si substrate in a mixture of $SiCl_4$ and $H_2$ with their diameters determined by the size of Au particles that had been placed on the surface prior to growth.

A range of metal catalysts have been shown to work for the synthesis of carbon nano fibers and CNTs [Ref. 15]. Takagi et al. [Ref. 16] have shown that pyrolysis of ethanol can be used in the presence of Fe, Co or Ni (the most common catalysts), Pt, Pd, Cu, Ag, or Au for the growth of single-walled carbon nanotubes (SW—CNT). For the latter three metals to work, not only do they have to be clean to start with, they must also be smaller than 5 nm in diameter for growth to be efficient. They propose that the essential role of metal particles is to provide a platform on which carbon atoms can form a hemispherical cap from which SW—CNT grow in a self-assembled fashion. Both CNTs and vapor-grown CNFs are now commercially available, but at an extremely high cost.

The art of catalytic synthesis of semiconductor or insulator-type nano wires from a wide range of material systems have been reviewed by Kolasinski [Ref. 17] and by Wang, et al. [Ref. 18]. These material systems include Si nanowires (SiNW), heterojunctions between SiNW and CNT, $SiO_x$ (a sub-stoichiometric silicon oxide), $SiO_2$, $Si_{1-x}Ge_x$, Ge, AlN, γ-$Al_2O_3$, oxide-coated B, $CN_x$, CdO, CdS, CdSe, CdTe, α-$Fe_2O_3$ (hematite), ε-$Fe_2O_3$ and $Fe_3O_4$ (magnetite), GaAs, GaN, $Ga_2O_3$, GaP, InAs, InN (hexangular structures), InP, $In_2O_3$, $In_2Se_3$, LiF, $SnO_2$, ZnO, ZnS, ZnSe, Mn doped $Zn_2SO_4$, and ZnTe. These nanowires can be used as anode active materials.

Metal nano wires can be produced using solution phase reduction, template synthesis, physical vapor deposition, electron beam lithography, and electrodeposition, as reviewed by Walter, et al. [Ref. 19]. Kogiso, et al. [Ref. 20] proposed a method of producing metal nano wires that included reducing a nano fiber comprising a metal complex peptide lipid. Metal nanowires can be used herein as conductive filaments.

The nano-scaled graphene platelets (NGPs) may be obtained from intercalation, exfoliation, and separation of graphene sheets in a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or polymeric carbon. For instance, natural graphite may be subjected to an intercalation/oxidation treatment under a condition comparable to what has been commonly employed to prepare the so-called expandable graphite or stable graphite intercalation compound (GIC). This can be accomplished, for instance, by immersing graphite powder in a solution of sulfuric acid, nitric acid, and potassium permanganate for preferably 2-24 hours (details to be described later). The subsequently dried product, a GIC, is then subjected to a thermal shock (e.g., 1,000° C. for 15-30 seconds) to obtain exfoliated graphite worms, which are networks of interconnected exfoliated graphite flakes with each flake comprising one or a multiplicity of graphene sheets. The exfoliated graphite is then subjected to mechanical shearing (e.g., using an air milling, ball milling, or ultrasonication treatment) to break up the exfoliated graphite flakes and separate the graphene sheets [Refs. 22-27]. The platelet surfaces can be readily deposited with a coating of the active material. We have found that intercalation and exfoliation of graphite fibers result in the formation of NGPs with a high length-to-width ratio (typically much greater than 3). The length-to-thickness ratio is typically much greater than 100.

Another particularly preferred class of electrically conductive filaments includes nano fibers obtained via electro-spinning of polymer-containing fluids [Refs. 28-30] or pitch. The main advantage of electro-spinning is the ability to produce ultra-fine fibers ranging from nanometer to submicron in diameter. The electro-spinning process is fast, simple, and relatively inexpensive. The process can be used to form fibers from a wide range of polymer liquids in solution or melt form. The polymer may contain a desired amount of conductive additives to make the spun fibers electrically conductive. Because of the extremely small diameters and excellent uniformity of electro-statically spun fibers, high-quality nonwoven fabrics or webs having desirable porosity characteristics can be readily produced by this technique. Many electro-spun polymer fibers can be subsequently heat-treated or carbonized to obtain carbon nano fibers. For instance, polyacrylonitrile (PAN), copolymers of pyromellitic dianhydride (PMDA) and 4,4'-oxydianiline (ODA), and CNT- or NGP-containing PAN can be made into a solution, which is then electro-spun into nanometer fibers. The fibers can be successfully carbonized at 1,000-1,500° C. to produce carbon fiber webs with a tensile strength of 5.0 MPa (or much higher if containing CNTs or NGPs) and an electrical conductivity of >2.5 S/cm. The electrical conductivity can be increased by up to 4 orders of magnitude if the carbonized fiber is further graphitized at a temperature higher than 2,500° C.

The polymer nano fibers can be electrically conductive if the precursor polymer is intrinsically conductive (e.g., conjugate chain polymers such as polyaniline, PANi). Conductive fillers, such as carbon black, nano metal particles, CNTs, and NGPs, may be added to the polymer solution prior to electro-spinning. The resulting electro-spun fibers will be electrically conductive. A polymer fiber may become surface-conductive if the fiber surface is deposited with a conductive material, such as copper or conductive polymer. In addition, carbonization and optional graphitization of a polymer fiber can significantly increase the electrical conductivity. A major advantage of electro-spun and carbonized nano fibers is its low cost, which can be an order of magnitude less expensive than vapor-grown CNFs and two orders of magnitude less expensive than CNTs.

Figure 3:
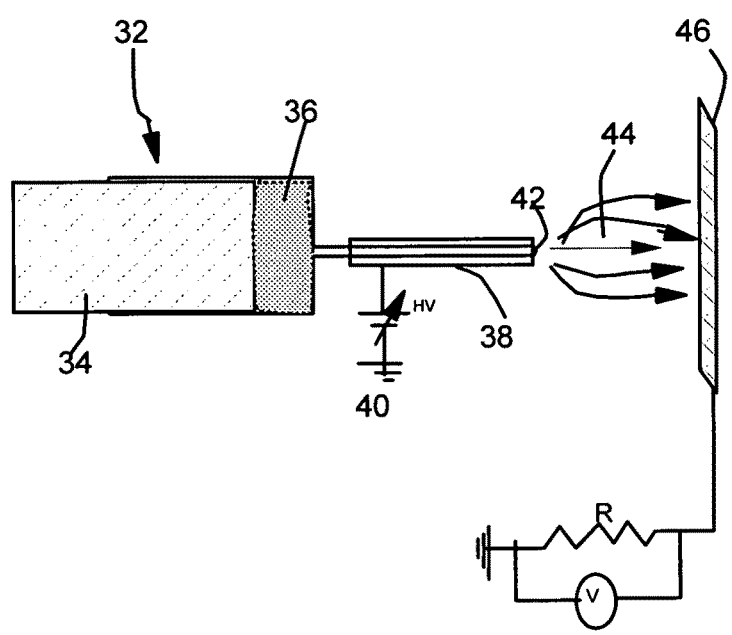
FIG. 3 Schematic of an electro-spinning apparatus.

For illustration purposes, electro-spinning of a polymer or a polymer containing a conductive additive (e.g., NGPs or carbon black) is herein described. As schematically shown in FIG. 3, the process begins with the preparation of a polymer solution and, if NGPs are needed, dispersion of NGPs in a polymer-solvent solution to prepare a suspension solution, which is contained in a chamber 36 of a syringe-type configuration 32. The syringe may be connected to a metering pump or simply contains a drive cylinder 34, which can be part of a metering device. A metal-coated syringe needle 38 serves as an electrode, which is connected to a high-voltage power supply 40. When a proper voltage is applied, charges begin to build up in the suspension. At a critical charge level, repulsive forces overcome the surface tension of the suspension, ejecting streams of fluid out of an orifice 42. The streams of suspension, in the form of thin, elongated fibrils 44, move toward a collector screen 46 while the solvent vaporizes, leaving behind dried fibrils that are collected on the screen, which may be electrically grounded or at a potential different than the potential at the needle electrode 48. The collector screen 46 serves to collect the nanocomposite fibrils produced. Electro-spinning apparatus are well-known in the art.

In a best mode of practice for producing electro-spun NGP-containing polymer nano fibers, the preparation of a suspension solution for electro-spinning is accomplished by first preparing two solutions (A=solvent+NGPs and B=solvent+polymer) and then mixing the two solutions together to obtain the suspension solution. The NGPs may be added to a solvent with the resulting suspension being subjected to a sonication treatment to promote dispersion of separate NGPs in the solvent. This fluid is a solvent for the polymer, not for the NGPs. For NGPs, this fluid serves as a dispersing medium only. The resulting suspension solution is hereinafter referred to as Suspension A. Suspension solution B is obtained by dissolving the polymer in the solvent with the assistance of heat and stirring action. Suspensions A and B are then mixed together and, optionally, sonicated further to help maintain a good dispersion of NGPs in the polymer-solvent solution.

With a syringe needle nozzle tip of approximately 2-5 µm, the resulting nanocomposite fibrils have a diameter typically smaller than 300 nm and more typically smaller than 100 nm. In many cases, fibrils as small as 20-30 nm in diameter can be easily obtained. It is of great interest to note that, contrary to what would be expected by those skilled in the art, the NGP loading in the resulting nanocomposite fibrils could easily exceed 15% by weight. This has been elegantly accomplished by preparing the suspension solution that contains an NGP-to-polymer weight ratio of 0.15/0.85 with the ratio of (NGP+polymer) to solvent being sufficiently low to effect ejection of the suspension into fine streams of fluid due to properly controlled suspension solution viscosity and surface tension. Typically, the (NGP+polymer)-to-solvent ratio is between 1/5 and 1/10. The excess amount of solvent or dispersion agent was used to properly control the fluid properties as required. The solvent or dispersing agent can be quickly removed to produce dried nanocomposite fibrils with the desired NGP loading. The NGPs have a thickness preferably smaller than 10 nm and most preferably smaller than 1 nm.

Preferably, the NGPs have a width or length dimension smaller than 100 nm and further preferably smaller than 30 nm. These NGP dimensions appear to be particularly conducive to the formation of ultra-fine diameter nanocomposite fibrils containing a large loading of NGPs.

Preferred matrix polymers are polyacrylonitrile (PAN) and a mixture of polyaniline (PANi) and polyethylene oxide (PEO). PAN fibrils obtained by electro-spinning can be readily converted into carbon nano fibers by heating the fibrils at a temperature of 150° C. to 300° C. in an oxidizing environment and then carbonizing the oxidized fibers at a temperature of 350° C. to 1,500° C. If further heat-treated at a temperature of 2,000° C. and 3,000° C., the carbon nano fibers become graphite nano fibers. The fibrils of the (PANi+PEO) mixture are intrinsically conductive and do not require any carbonization treatment. Electro-spinning also enables fibrils to intersect and naturally bond to one another for forming a web that has a desired network of conductive filaments.

Figure 4:
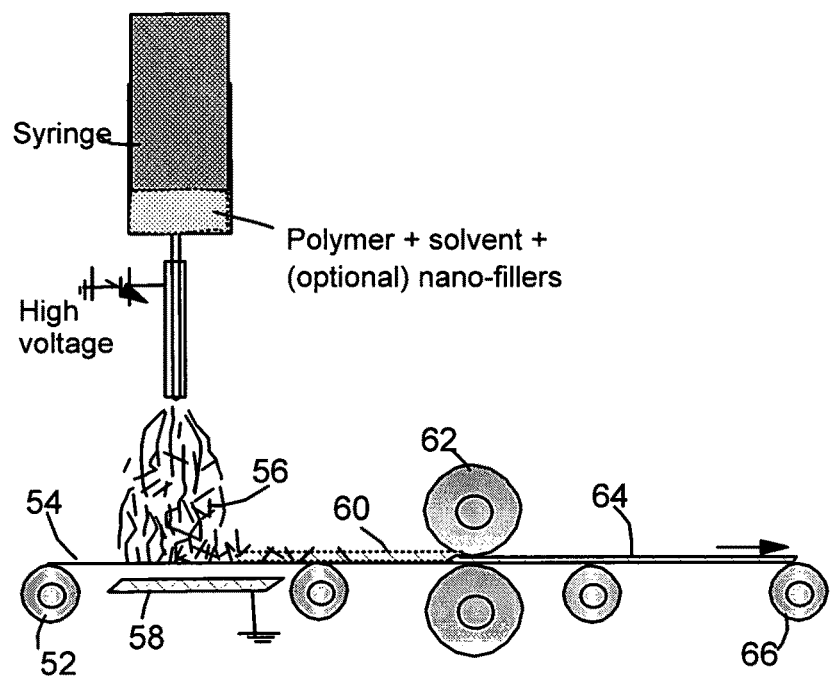
FIG. 4 Schematic of a roll-to-roll apparatus for producing a roll of mats or webs from electro-spun fibers.

Multiple filaments can be easily combined to form an aggregate, such as in a mat, web, non-woven, or paper form. In the case of electro-spun fibrils, the fibrils may naturally overlap one another to form an aggregate upon solvent removal. Schematically shown in FIG. 4 is an innovative roll-to-roll process for continuously producing rolls of electro-spun nano fibril-based porous thin film, paper, mat, or web. The process begins with reeling a porous substrate 54 from a feeder roller 52. The porous substrate 54 is used to capture the electro-spun nano fibrils 56 that would otherwise be collected by a stationary collector 58 (disposed immediately below the moving substrate), which is now just a counter electrode for the electro-spinning apparatus disposed above the moving substrate. Optionally, multiple filaments of electro-active materials (e.g., Si or $SiO_2$ nanowires) may be concurrently sprayed over the electro-spun fibers to form a mixed stack of two types of filaments. The collected fibril mat 60 may be slightly compressed by a pair of rollers 62. The rollers may be optionally heated to melt out the polymer surface in the nano fibrils to consolidate the mat 64 into an integral web. The web, paper, or mat may be continuously wound around a take-up roller 66 for later uses.

Several techniques can be employed to fabricate a conductive aggregate of filaments (a web or mat, with or without the electro-active filaments), which is a monolithic body having desired interconnected pores. In one preferred embodiment of the present invention, the porous web (for either anode or cathode use) can be made by using a slurry molding or a filament/binder spraying technique. These methods can be carried out in the following ways:

As a wet process, an aqueous slurry is prepared which comprises a mixture of filaments (at least one or two types of filaments) and, optionally, about 0.1 wt % to about 10 wt % resin powder binder (e.g., phenolic resin). The slurry is then directed to impinge upon a sieve or screen, allowing water to permeate through, leaving behind filaments and the binder. As a dry process, the directed fiber spray-up process utilizes an air-assisted filament/binder spraying gun, which conveys filaments and an optional binder to a molding tool (e.g., a perforated metal screen shaped identical or similar to the part to be molded). Air goes through perforations, but the solid components stay on the molding tool surface.

Figure 5:
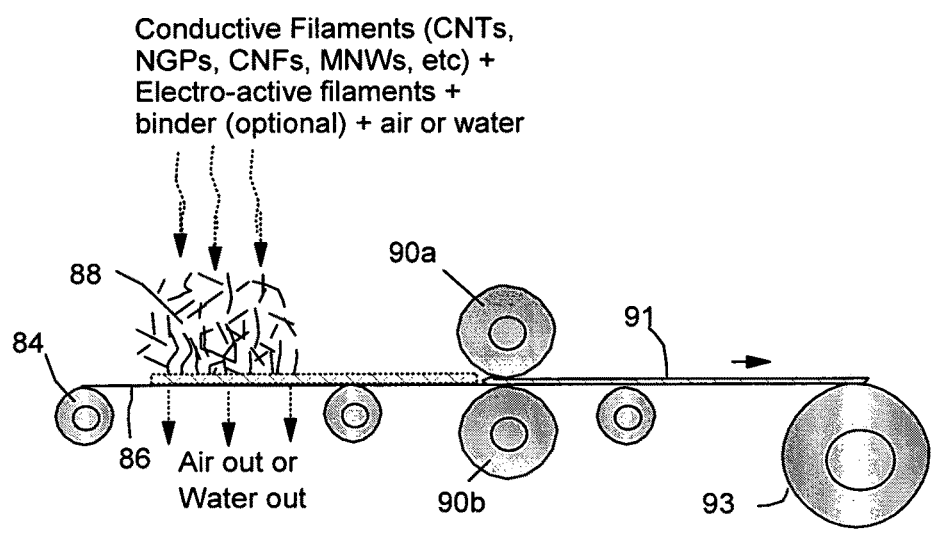
FIG. 5 Schematic of a roll-to-roll apparatus for producing a roll of mats or webs from various conductive filaments and/or electro-active filaments.
Figure 8:
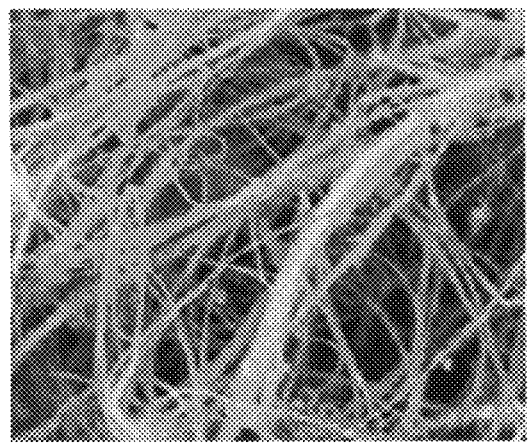
FIG. 8 An SEM image of Si nanowires.

Each of these routes can be implemented as a continuous process. For instance, as schematically shown in FIG. 5, the process begins with pulling a substrate 86 (porous sheet) from a roller 84. The moving substrate receives a stream of slurry 88 (as described in the above-described slurry molding route) from above the substrate. Water sieves through the porous substrate with all other ingredients (a mixture of filaments and a binder) remaining on the surface of the substrate being moved forward to go through a compaction stage by a pair of compaction rollers 90a, 90b. Heat may be supplied to the mixture before, during, and after compaction to help cure the thermoset binder for retaining the shape of the resulting web or mat. The web or mat 91, with all ingredients held in place by the thermoset binder, may be stored first (e.g., wrapped around a roller 93).

Similar procedures may be followed for the case where the mixture 88 of filaments and the binder is delivered to the surface of a moving substrate 86 by compressed air, like in a directed fiber/binder spraying route described above. Air will permeate through the porous substrate with other solid ingredients trapped on the surface of the substrate, which are conveyed forward. The subsequent operations are similar than those involved in the slurry molding route.

In yet another preferred embodiment, the web may be made from nano filaments (such as NGPs, GNFs, CNTs, and metal nano wires), with or without electro-active filaments, using a conventional paper-making process, which is well-known in the art.

If the electro-active filament has not been incorporated in the web-, mat-, or paper-like structure during the web-making stage, electro-active nanowires may then be catalytically grown out from surfaces of constituent conductive filaments. This can be accomplished by coating a thin layer of catalyst on the filament surface for promoting growth of nanowires from catalyst spots, to be further explained later.

Anode Active Materials:

The anode active material for use in the present invention is preferably selected from the following groups of materials:

(1) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form deposited on the exterior surface of the supporting filaments. The coating is preferably thinner than 10 µm, more preferably thinner than 1 µm, and most preferably thinner than 100 nm. This group of material was chosen for our studies due to the notion that their theoretical capacity is significantly higher than that of graphite alone: $Li_{4.4}Si$ (3,829-4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

(2) The alloys or intermetallic compounds of Si, Ge, Sn, Pb, Sb, Bi, Zn, Al, or Cd, stoichiometric or non-stoichiometric, with other elements; and (3) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd. For instance, composite oxides may be prepared by co-vaporizing two metal elements (e.g., Sn and B), which are then allowed to react with oxygen at a desired elevated temperature. (e.g., to produce a mixture of SnO and $B_2O_3$). SnO or $SnO_2$ alone is of particular interest due to their high theoretical capacities. Iron oxide is of interest since $Li_6Fe_2O_3$ has a theoretical capacity of 1,000 mAh/g. The capacity of $SnS_x$ is as high as 620 mAh/g and is stable under charge-discharge cycling conditions.

Chemical vapor deposition (CVD), laser ablation, physical vapor deposition, thermal annealing, and meso-pore template-assisted growth are commonly used methods to synthesize nanowires. In the CVD method, the precursor gas is delivered to the surface of a substrate, where catalytic synthesis occurs. Laser ablation method involves a target that is first thermally pressed and placed in the chamber on a target plate. The target is vaporized under low pressure using a laser beam which condenses on the catalyst supported on a substrate. In the physical vapor deposition method the source is evaporated and condensed directly onto the substrate and a catalyst is not required. In the thermal annealing method the source material is vaporized and transported by a carrier gas to the substrate surface on which a catalyst is pre-deposited. The vapor condenses onto the molten catalyst and source alloy. After saturated equilibrium condition is achieved, nanowires grow to maintain the equilibrium in the liquid phase.

A well understood mechanism for the growth of nanowires is the vapor-liquid-solid (VLS) mechanism, where a phase diagram is usually used to determine the favorable conditions for growth of nanowires. For instance, the melting temperature for gold is lower than that for silicon. In order to grow the nanowire a temperature between the two melting points is selected for the evaporation segment, and a lower temperature is selected for the synthesis segment that favors condensation into the gold-silicon alloy. The growth occurs when silicon diffuses into the alloy puddle which increases the Au—Si interface, enhancing melting of Si into the alloy. The composition of Au—Si in the nanowire can be selected by changing the temperature according to a phase diagram. The advantage to using a catalyst-assisted mechanism is that the direction and location of nanowire growth can be controlled.

The most preferred anode active materials according to a preferred embodiment of the invention include at least one of silicon (Si), germanium (Ge), and tin (Sn) as an element. This is because silicon, germanium, and tin have a high capability of inserting and extracting lithium, and can reach a high energy density. The next preferred group of elements includes lead (Pb), antimony (Sb), bismuth (Bi), zinc (Zn), aluminum (Al), and cadmium (Cd). Any of these two sets of elements may be included as a primary element in an anode active material, which is made as a nanowire (preferred) or as a coating on a surface of an inactive filament substrate. The cycling stability of the resulting mixed nano filament anode material was found to be superior to that of the same anode active material in a fine powder form, thin-film form (coated directly on a current collector), or in a form of parallel nanowires that are end-connected to a current collector [as in Ref. 21].

In general, the active material may include only one kind or a mixture of a plurality of kinds selected from the group consisting of Si, Ge, Sn, Pb, Sb, Bi, Zn, Al, and Cd. In the invention, the alloy or compound may include one or more kinds of metal elements from this group and one or more kinds of metal elements from other groups. Further, the alloy or compound may include a non-metal element. The active alloy or compound material may be a solid solution, a eutectic (eutectic mixture), an intermetallic compound (stoichiometric or non-stoichiometric), or the coexistence of two or more kinds selected from them. Preferably, the material comprises a nanocrystalline or amorphous phase.

As an alloy or compound of silicon, for example, an active material may include at least one element selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr) as a second element in addition to silicon. As an alloy or compound of tin, for example, an active material may include at least one kind selected from the group consisting of silicon, nickel, copper, iron, cobalt, manganese, zinc, indium, silver, titanium, germanium, bismuth, antimony and chromium as a second element in addition to tin.

As a compound of silicon or a compound of tin, for example, a compound including oxygen (O), carbon (C), nitrogen (N), sulfur (S), or phosphorous (P) may be used, and the compound may include the above-described second element in addition to tin or silicon.

Another preferred class of electrochemically active material that can be made into nano filaments include the oxides, carbides, nitrides, sulfides, phosphides, selenides, tellurides, or their mixtures (e.g., co-oxides or composite oxides) of Si, Ge, Sn, Pb, Sb, Bi, Zn, Al, Fe, or Cd. Most of these nanowires can be synthesized by several chemical routes, including vapor—liquid—solid (VLS), surface diffusion and epitaxy, oxide-assisted growth (OAG), solution-based growth, and template-directed assembly. All of these materials can be produced into nanowires using a meso-porous template.

As an example, in the present study, a thermal evaporation system featuring a furnace that has two heating zones was used for the preparation of Ge nanowires. Large quantities of single crystalline Ge nanowires were synthesized in the system in vacuum (at a pressure of approximately 0.1 mtorr) or atmospheric pressure at a temperature in the range of 450° C. to 600° C. In this two-zone furnace system, the nanowire growth temperature and source evaporation temperature were separately controlled. This configuration enabled the synthesis of nanowires at relatively low temperatures on an Au-coated substrate in Zone 2, using a Ge powder source positioned in Zone 1 at a higher evaporation temperature. A carrier gas was flowed into Zone 1 to pick up Ge vapor and send the vapor into Zone 2. Compared to other methods, such as laser ablation, metal-organic chemical vapor deposition (MOCVD), and chemical vapor deposition (CVD), this thermal evaporation system features a much simpler reactor configuration and non-hazardous starting materials and gases.

It may be noted that, based on phase-diagram considerations, Ge nanowires can be synthesized within a relatively broad temperature range, from 363° C. (eutectic point of Au—Ge alloy) to 938° C. (Ge melting point) using Au as catalyst. However, the effective temperature range in which we could consistently grow Ge nanowires using Ge powder as the feeding source, followed by Au-catalyzed VLS growth mechanism, was from 410° C. to 850° C. Below 410° C. or above 850° C., one tended to obtain Ge nano particles rather than nanowires.

As another example, SnS nanowires were synthesized by a thermo-chemical treatment of the ethylene glycol solution of $SnCl_2$ and sulfur sources. In a typical synthesis, 0.226 g of $SnCl_2.2H_2O$ and 0.72 g of $Na_2S.9H_2O$ were dissolved in 30 ml of ethylene glycol on a separate basis. The $Na_2S$ solution was then added drop-wise to the $SnCl_2$ solution and magnetically stirred to form a slurry. Then, the slurry was placed in a 100-ml autoclave preferably with a Teflon liner for protection against corrosion and corrosion-induced contamination. The autoclave was maintained at 180-200° C. for 12 h, and then air cooled to room temperature. The resulting light gray precipitates were collected and washed with ethanol and distilled water several times, and then dried in vacuum at 60° C. for 10 h.

A further example is related to the synthesis of amorphous silicon dioxide nanowires, which may be accomplished as follows: A piece of graphite and an alumina boat (degassed in vacuum beforehand) filled with commercial silicon powder was placed into a quartz tube of a horizontal furnace. The piece of graphite was situated at an upstream position that allowed graphite to be in contact with the gas flow first. In a typical experiment, the system was degassed in vacuum then heated under a mixture of Ar/O2 up to 1,200° C. with a heating rate of 200°/h. The temperature was maintained at 1,200° C. for 30 minutes and then allowed to cool down to room temperature in 10 hours. The resulting product was a white cotton-like solid collected directly on the top of the alumina boat.

In order to improve the electrical conductivity of non-metallic nanowires, one may choose to coat a thin layer of carbon on the nanowire surface. This can be accomplished by a range of well-known processes, e.g., chemical vapor deposition (without a catalyst) and pyrolyzation of the polymer matrix that contains nanowires dispersed therein.

The conductive filaments and the electro-active nanowires may be prepared separately first and then physically mixed together. Alternatively, one may choose to grow nanowires from a catalyst seeded on the surface of a conductive filament. This may be accomplished by coating a thin layer of catalyst (e.g., Au) on the surface of CNFs using sputtering, electro-plating, electroless plating, melt dipping, sol gel coating, chemical vapor deposition, etc. Nanowires of Si or Ge, as two examples, can then be grown from the catalyzed surface of the conductive filaments. This approach was found to produce a web-, mat-, or paper-like structure that featured intertwined filaments, in which nanowires intersected conductive filaments at multiple points of contact, not just at the catalyzed spot where a nanowire was nucleated from. Further alternatively, electro-active nanowires may be produced first, which are coated with a thin layer of nano particle catalysts (e.g., Ni—Cu or Fe particles). The catalyst-coated nanowires are then positioned in a reactor into which a stream of precursor gases (e.g., acetylene or methane with a carrier gas) is introduced. Carbon nano fibers are then grown from the surface of nanowires at a temperature of approximately 550-750° C. In this way, an integral web comprising intertwined conductive filaments (CNFs) and electro-active filaments (nanowires) is made.

Electrolytes for Li Ion Batteries

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and its viscosity is relatively high at room temperature or lower, so that its ion conductivity is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$, and $LiN(CF_3SO_2)_2$ are preferred. The content of aforementioned electrolytic salts in the non-aqueous solvent is preferably 0.5 to 2.0 mol/l.

Cathode Active Materials

One preferred embodiment of the present invention is a lithium ion battery that comprises an anode active material in the form of mixed nano filament as described above. In this situation, a cathode may be made from a cathode active material either in a conventional form (e.g., lithium cobalt oxide in a fine powder form or a thin film coated directly on a current collector) or in the form of a mixed nano filament composition as herein specified. Preferably, the cathode comprises electrically active filaments (e.g., CNFs) that are mixed with multiple nanowires of a cathode active material (e.g., lithium cobalt oxide nanowires). A further preferred embodiment of the present invention is a lithium ion battery that comprises an anode based on the aforementioned mixed nano filament composition and a cathode also based on a mixed nano filament composition.

In a lithium ion battery comprising an anode featuring a mixed nano filament composition, the partner cathode can be just a conventional positive electrode. Conventional positive electrode (cathode) active materials are well-known in the art. The positive electrode can be manufactured by the steps of (a) mixing a positive electrode active material with a conductor agent (conductivity-promoting ingredient) and a binder, (b)

dispersing the resultant mixture in a suitable solvent, (c) coating the resulting suspension on a collector, and (d) removing the solvent from the suspension to form a thin plate-like electrode. The positive electrode active material may be selected from a wide variety of oxides, such as manganese dioxide, lithium/manganese composite oxide, lithium-containing nickel oxide, lithium-containing cobalt oxide, lithium-containing nickel cobalt oxide, lithium-containing iron oxide and lithium-containing vanadium oxide. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium vanadium phosphate because these oxides provide a high cell voltage and good cycling stability.

In the preparation of conventional cathodes, acetylene black, carbon black, or ultra-fine graphite particles may be used as a conductor agent. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, mesophase pitch, coal tar pitch, and petroleum pitch may also be used. Preferable mixing ratio of these ingredients may be 80 to 95% by weight for the positive electrode active material, 3 to 20% by weight for the conductor agent, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

Preferably, however, the lithium ion battery comprises a cathode that also features a presently invented mixed nano filament composition, explained as follows: The electrically conductive filaments in this composition again can be selected from NGPs, CNFs, GNFs, CNTs, metal nanowires, metal-coated nanowires, metal-coated nano fibers, and the like. The electrochemically active filaments may comprise nanowires of a cathode-active material, such as manganese oxide, cobalt oxide, nickel oxide, and lithium iron phosphate ($LiFePO_4$). Again, a broad array of techniques can be used to produce these nanowires, e.g., chemical vapor deposition (CVD), laser ablation, physical vapor deposition, thermal annealing, and meso-pore template-assisted growth. Examples of the processes for the preparation of manganese oxide, cobalt oxide, nickel oxide, and iron phosphate (e.g., $LiFePO_4$) nanowires can be found in [Refs. 31-36]. We also provide some examples as described in the following:

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. The grain sizes of the crystalline phases were determined by the Scherer equation. When the grain size was calculated to be less than 50 nanometers, the phase was considered to be nanocrystalline. In several cases, scanning electron microscopy (SEM) and transmission electron microscopy (TEM) were used to characterize the structure and morphology of the hybrid material samples.

A web of mixed filaments was bonded onto a copper foil to be employed as a collector. After being dried, web-copper foil configuration was hot-pressed to obtain a negative electrode. An NGP-containing resin was used as the binder for this purpose. Filaments may also be bonded by an intrinsically conductive polymer. For instance, polyaniline-maleic acid-dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

Unless otherwise noted, the conventional cathode of a lithium ion battery featuring a mixed nano filament anode was prepared in the following way. First, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 μm) serving as a current collector. The resulting two-layer aluminum foil-active material configuration was then hot-pressed to obtain a positive electrode.

A positive electrode, a separator composed of a porous polyethylene film, and a negative electrode was stacked in this order. The stacked body was spirally wound with a separator layer being disposed at the outermost side to obtain an electrode assembly as schematically shown in FIG. 2. Hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent). The electrode assembly and the non-aqueous electrolyte were placed in a bottomed cylindrical case made of stainless steel, thereby obtaining a cylindrical lithium secondary battery.

The following examples are presented primarily for the purpose of illustrating the best mode practice of the present invention, not to be construed as limiting the scope of the present invention.

Example 1

Conductive Filaments from Electro-Spun PAA Fibrils

Poly(amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus schematically shown in FIG. 3. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain Sample c-PI-0 with an average fibril diameter of 67 nm.

Scanning electron micrographs (SEM) of electro-spun PI fibers (PI-0, before carbonization) and Sample c-PI-0 (PI fibers after carbonization) are shown in FIGS. 6(A) and 6(B), respectively. Sample c-PI-0 (25% by weight) was then mixed with Sn nanowires obtained in Example 8 to produce an Anode Sample c-PI-Sn.

Example 2

Conductive Filaments from Electro-Spun PAN Fibrils and NGP-Containing PAN Fibrils Suspension solutions were obtained by first preparing two solutions (A=solvent+NGPs and B=solvent+polymer) and then mixing the two solutions together to obtain the suspension solution. In the case of NGP-PAN fibril, the solvent used was N,N,-dimethyl formamide (DMF). For the preparation of Suspension A, the NGPs were added to a solvent and the resulting suspensions were sonicated to promote dispersion of separate NGPs in the solvent with a sonication time of 20 minutes. Suspension solution B was obtained by dissolving the polymer in the solvent with the assistance of heat (80° C. for DMF+PAN) and stirring action using a magnetic stirrer typically for 90 and 30 minutes, respectively. Suspensions A and B were then mixed together and further sonicated for 20 minutes to help maintain a good dispersion of NGPs in the polymer-solvent solution. An electrostatic potential of 10 kV was applied over a distance of 10 cm between the syringe needle tip and a 10 cm×10 cm porous aluminum plate that was grounded.

A range of NGP-polymer proportions in the original suspension solution were prepared (based on (NGP wt.)/(NGP wt.+polymer weight)): 0%, 5%, and 10% for PAN compositions. The resulting nanocomposite fibrils, after the solvent was completely removed, had comparable NGP-polymer ratios as the original ratios. They are designated as Samples PAN-0, PAN-5, and PAN-10, respectively. The average diameter of these fibrils was approximately 75 nm. The NGP-PAN nanocomposite fibrils were converted to carbon/carbon nanocomposite by heat-treating the fibrils first at 200° C. in an oxidizing environment (laboratory air) for 45 minutes and then at 1,000° C. in an inert atmosphere for 2 hours. The resulting carbonized samples are referred to as Samples c-PAN-5 and c-PAN-10, respectively. NGP-free PAN fibrils were also carbonized under comparable conditions to obtain Sample c-PAN-0. Their diameters became approximately 55 nm. FIG. 7 shows a SEM image of c-PAN-5. Sample c-PAN-0 was then mixed with $SnO_2$ nanowires prepared in Example 7 to obtain an Anode Sample c-PAN-$SnO_2$.

Example 3

Preparation of NGP-based Webs (Aggregates of NGPs+Si Nanowires, and NGPs+CNFs+Si Nanowires)

Continuous graphite fiber yarns (Magnamite AS-4 from Hercules) were heated at 800° C. in a nitrogen atmosphere for 5 hours to remove the surface sizing. The yarns were cut into segments of 5 mm long and then ball-milled for 24 hours. The intercalation chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite fibers (20 g) were added under vigorous stirring to avoid agglomeration. After the graphite fiber segments were well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite fiber sample. The dried, expandable graphite fiber sample was quickly placed in a tube furnace preheated to 1,000° C. and allowed to stay inside a quartz tube for approximately 40 seconds to obtain exfoliated graphite worms. The worms were dispersed in water to form a suspension, which was ultrasonicated with a power of 60 watts for 15 minutes to obtain separated NGPs.

The suspension was divided into two batches. In one batch, 80% by weight of Si nanowires (prepared in Example 5) was added to the NGP-containing suspension, the resulting mixture was filtered and dried to obtain several paper-like mats, referred to as Anode Sample NGP-Si. Vapor grown CNFs and Si nanowires were then added to the second batch of the suspension to form a mixture containing both NGPs (25%), CNFs (5%) and Si nanowires (70%), which was dried and made into several paper-like mats (Anode Sample NGP-CNF-Si).

Example 4

Preparation of Conductive Webs from CNTs and Vapor-Grown CNFs

CNTs (catalytically grown at 850° C.) and vapor-grown CNFs (Applied Science, Inc., Cedarville, Ohio), in combination with Si nanowires (prepared in Example 5), were separately made into mixed nano filament webs using a conventional paper-making procedure. Basically, a slurry of CNTs+ Si nanowires or CNFs+Si nanowires was poured over a top surface of a Teflon-based membrane with sub-micron pores. Water permeates through the membrane pores with the assistance of a suction force created by a vacuum pump-generated pressure differential between the top surface and the bottom surface of the membrane. Solid ingredients (CNTs+Si nanowires or CNFs+Si nanowires) stay on the top surface of the membrane, which may be separated from the membrane and dried to become a sheet of porous paper or mat (Sample CNT-Si and Sample CNF-Si).

Example 5

Preparation of Si Nanowires for Anodes

In the present study, the substrate used was an n-type Si wafer with a (<100>) surface. The silicon substrate was cleaned ultrasonically in acetone and, in turn, in ethanol for 10 min each and then rinsed with deionized water. Ni catalyst was deposited onto the Si wafer surface using electroless plating. Prior to the electroless plating, the substrate surface was sensitized by immersion in $SnCl_2$/HCl solution (10 g/l $SnCl_2$+40 mil/l HCl) for 20 minute and then activated by immersion in $PdCl_2$/HCL solution (0.3 g/l $PdCl_2$+2.5 mil/l HCl) for 5 min.

A plating bath consisting of $NiSO_4.6H_2O$ (87 g/l), $NaH_2PO_2.H_2O$ (24 g/l), $C_2H_2(COONa)_2.6H_2O$ (4.1 g/l), $C_3H_4(OH)(COOH)_3.H_2O$ (2 g/l), $Pb(CH_3COO)_2.3H_2O$ ($1.5 \times 10^{-3}$ g/l), and $CH_3COONa.3H_2O$ (301 g/l). The plating conditions were: 85° C. and pH value of 4.6 (adjusted by $H_2SO_4$ aqueous solution). The plating time was 1 to 5 minutes. Once Ni catalyst was coated onto the Si substrate, a solid-liquid-solid (SLS) type growth experiment was conducted using a thermal CVD system under a nitrogen atmosphere with a pressure of $2.7 \times 10^4$ Pa at 955° C. for one hour.

Example 6

Chemical Vapor Deposition of CNFs on Si Nanowires

An aggregate of Si nanowires was immersed in a 0.2 M nickel nitrate ethanol solution for one minute, then removed from the solution and dried. The dip-coated aggregate was then positioned in a quartz reactor in which the nickel nitrate was reduced in hydrogen at 600° C. for one hour to form Ni nano particles on the surface of Si nanowires.

Figure 9:
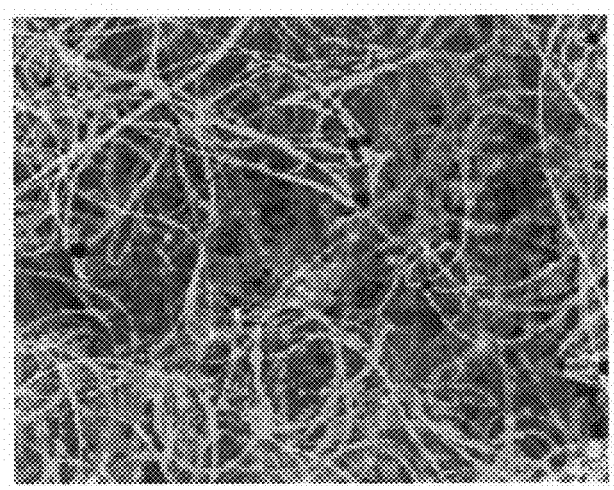
FIG. 9 An SEM image of mixed filaments.

Carbon nano fibers were then grown from the surface of Si nanowires using a catalytic CVD technique. The catalyst-coated Si nanowires were placed in a quartz reactor at 600° C. The reactant and carrier gases, $C_2H_2$, $H_2$, and $N_2$ were introduced into the reactor at a flow rate of 30, 150, and 100 sccm (standard cubic centimeters per minute), respectively. After a reaction time of 30 minutes, the sample was cooled down to room temperature in a $N_2$ atmosphere and removed from the reactor. FIG. 9 shows a SEM image of a sample of mixed nano filaments (Anode Sample Si-CNF-2). On the very top surface are carbon nano fibers (CNFs) with a number of underlying Si nanowires barely visible (slightly out of focus due to a different depth of field).

Example 7

Preparation of $SnO_2$ Nanowires for Anodes

The equipment used in the study was a simple CVD system comprising a tube furnace, flow meters, a quartz tube, and an alumina crucible. Firstly, a P-type Si wafer as substrate was ultrasonically cleaned in acetone for 15 min, then etched in 10% HF for 10 min, and finally rinsed in deionized water. Second, $SnCl_2$ powder was placed at the center of an alumina crucible, and the Si substrate was placed at 5.0 cm from the center of the crucible. Then, the crucible was inserted into the quartz tube reactor, which was inserted into a tube furnace, with the center of the crucible positioned at the center of the furnace and the substrate placed downstream of the gas flow. The temperature of crucible was rapidly increased to 950° C. from room temperature and kept at 950° C. for 2.0 h under a constant flow of mixture gases of argon/oxygen. Argon was introduced into the quartz tube through a mass-flow controller at a rate of 100 sccm. The ratio of mixture gases $Ar/O_2$ was 4:1. After the furnace was slowly cooled down to room temperature, the Ar flow was turned off. The white-color, wool-like products ($SiO_2$ nanowires) were formed with a high yield on the walls of the crucible.

Example 8

Preparation of Sn Nanowires for Anodes

Several types of meso-porous template membranes are commercially available (e.g., from (Poretics, Inc., Whatman, and Osmonics). Our Sn nanowires were grown in track-etched polycarbonate membranes (Osmonics, Livermore, Calif.). The pores in these membranes are 1D channels with pore diameters of 50 nm and are aligned perpendicular to the face of the membrane within ±17°. The thickness and pore density of the membranes are 6 µm and $6 \times 10^8$ pores/cm$^2$, respectively. The electrolyte used for electrodeposition was 0.1 M $Sn_2SO_4$ aqueous solution with 2% gelatin by weight, and the pH value was adjusted to be near 1 with concentrated $H_2SO_4$.

Before electrodeposition, a 150-nm Au film was evaporated onto one side of the membrane that served as the conducting cathode. A pure tin wire was used as the anode, and electroplating was conducted under a constant voltage of 280 mV using a two-electrode system in a quartz tube cell at room temperature. The nanowires were collected by dissolving the polycarbonate membrane in dichloromethane and precipitating them from the solvent by the use of a centrifuge. The freestanding nanowires could then be stored in suspension in n-ethyl alcohol.

Example 9

Preparation of Manganese Oxide Nanowires for Cathodes

The manganese oxide nanowire arrays were electrodeposited into commercially available alumina membranes (Whatman Anodiscs, diameter=13 or 25 mm) with pore diameters of approximately 200 nm, with an estimated porosity of 42%. The alumina nano-templates were sputter-coated on one side with an Au film approximately 150 nm thick, and were mounted onto Au-coated Si substrates with fine graphite paste. The manganese oxide nanowire arrays were synthesized using an electrodeposition approach, which entails potentiostatic control with applied potential varied between 0.2 and 1.2V versus SCE in an alkaline manganese sulfate bath at room temperature. The bath consisted of an aqueous solution of 0.01M MnSO4 with 0.03M $(NH_4)_2SO_4$ as a complexing agent. The solution was maintained at a pH of 8 through the addition of $H_2SO_4$ or $NH_4OH$. By controlling the electrodeposition potential, the valence of the manganese in the electrodeposit can be tailored between mixtures of the divalent—trivalent and trivalent—tetravalent states. After electrodeposition, the alumina membranes were dissolved by immersing the samples in a 1M NaOH solution for about 6 h. The samples were then soaked in de-ionized water for 6 h. Conductive nano fibers (Sample c-PAN, 15% by weight) were then added into this water-$MnO_2$ mixture to form a slurry. The slurry was filtered and then air-dried for about 24 h to obtain a mixed nano filament-based cathode structure (Cathode Sample $MnO_2$-c-PAN).

Example 10

Preparation of $V_2O_5$ Nanowires for Cathodes

Vanadium oxides can be prepared by the sol-gel route via hydrolysis and condensation of alkoxide precursors. Sol-gel chemistry and template synthesis were combined to prepare the nanostructured crystalline $V_2O_5$ electrodes. The templates used here were polycarbonate filtration membranes (Poretics, Inc.) with a nominal pore diameter of 50 nm. The pores are cylindrical, nearly monodisperse in diameter, and extend through the thickness (6 mm) of the template membrane. A 1.5 cm$^2$ section of template membrane was placed on a Pt current collector (1.5×3 cm) in a glove box purged with argon. Then, a microliter syringe was used to apply 0.6 mL of the $V_2O_5$ precursor, tri-isopropoxy-vanadium (V) oxide (TIVO) (Strem Chemical, >98%) to the template membrane surface. The TIVO filled the pores in the template membrane and the space between the membrane and the underlying Pt current collector. Hydrolysis of the precursor was carried out in a glove box under very low water partial pressures. The reaction was allowed to proceed for 12 h, which resulted in the formation of nanowires of a TIVO gel. After gel formation, the composite was removed from the glove box and heated in air at 80° C. for 2 h. The template membrane was then removed with oxygen plasma (15 W, radio frequency power, 100 mTorr $O_2$, 2 h). Finally, dehydration and condensation of the precursor to crystalline $V_2O_5$ was accomplished by heating at 400° C. for 10 h in 150 psi $O_2$.

Carbon nano fibers were then grown from the surface of $V_2O_5$ nanowires using a catalytic CVD technique. The nano Fe catalyst-coated $V_2O_5$ nanowires were placed in a quartz reactor at 600° C. The reactant and carrier gases, $C_2H_2$, $H_2$, and $N_2$ were introduced into the reactor at a flow rate of 30, 150, and 100 sccm, respectively. After a reaction time of 30 minutes, the sample (Cathode Sample $V_2O_5$-CNF) was cooled down to room temperature in a $N_2$ atmosphere and removed from the reactor.

Example 11

Preparation of LiFePO$_4$ for Cathodes

LiOH monohydrate, ferric nitrate nonahydrate, ascorbic acid, phosphoric acid, and ammonium hydroxide were used to create the LiFePO$_4$ precursor solution. The template membranes were commercially available polycarbonate filters (Poretics). An approximately 1 cm$^2$ piece of the polycarbonate filter was immersed in a precursor solution of 1 M LiFePO$_4$ in water for 24 h. This solution was synthesized with ferric nitrate, lithium hydroxide, and phosphoric acid in proportions for a 1:1:1 molar ratio. Ascorbic acid, in equimolar ratio to the total metal (Li$^+$ plus Fe$^{2+}$) content, aided the synthesis by forming a complex with the iron, and ammonium hydroxide was used to raise the pH to ~2. The impregnated template was then dried in air at 80° C. for 10 min. This impregnated template assembly was heated in a reducing atmosphere of flowing Ar/H2 gas (95/5%). The temperature was slowly increased over the course of 4 h from 250 to 650° C. and held at 650° C. for 12 h. This procedure yields the Fe(II) oxidation state necessary for LiFePO$_4$ and decomposes the template into the carbon for improved conductivity. The carbon-coated LiFePO$_4$ nanowires were then mixed with CNFs (15% by weight) via a slurry mixing and filtration procedure to obtain Cathode Sample CNF-LiFePO$_4$. A control sample of carbon-coated LiFePO$_4$ nanowires without CNFs was also prepared for comparison purpose. This is referred to as Control Sample-LiFePO$_4$-1. Another control sample (Control Sample-LiFePO$_4$-2) was prepared from template-assisted synthesis of LiFePO$_4$ nanowires, but the template was etched away in an oxygen plasma environment. The nanowires, 10% by weight of acetylene black, and 5% by weight of ethylene-propylene-diene monomer powder were mixed together with toluene to obtain a mixture. The mixture was then coated on an aluminum foil (30 μm) serving as a current collector.

Example 12

Evaluation of Electrochemical Performance of various Mixed Filament Webs

The electrochemical properties were evaluated under an argon atmosphere by both cyclic voltammetry and galvanostatic cycling in a three-electrode configuration, with the mixed nano filament web-copper substrate as the working electrode and Li foil as both reference and counter-electrodes. A conductive adhesive was used to bond the filament end portions to the copper foil, which serves as a current collector. Charge capacities were measured periodically and recorded as a function of the number of cycles. The charge capacity herein referred to is the total charge inserted into the mixed nano filament web, per unit mass of the mixed filament (counting both conductive and electro-active filament weights), during Li insertion, whereas the discharge capacity is the total charge removed during Li extraction. The morphological or micro-structural changes of selected samples after a desired number of repeated charging and recharging cycles were observed using both transmission electron microscopy (TEM) and scanning electron microscopy (SEM).

Figure 10:
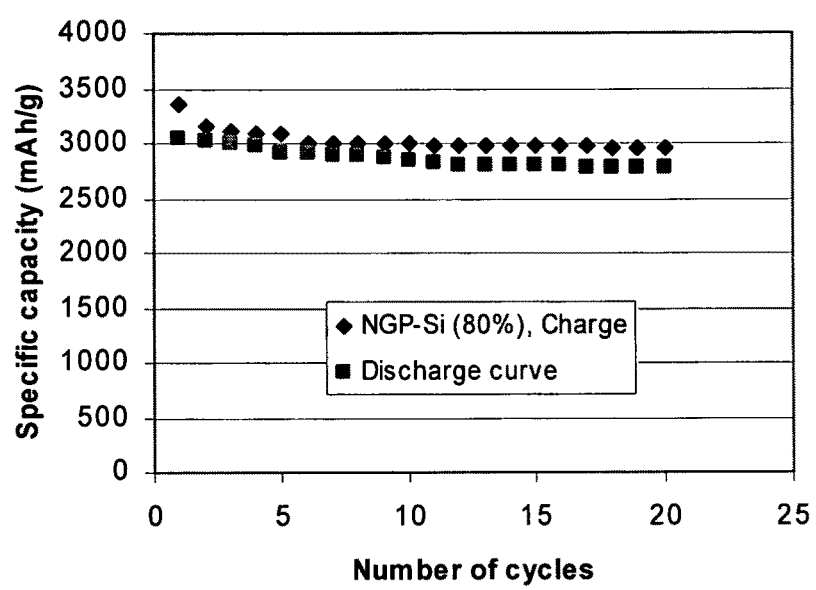
FIG. 10 Specific capacities of Sample NGP-Si (NGPs being the conductive filaments and Si nanowires the anode active filaments) plotted as a function of the number of charge and discharge cycles.
Figure 11:
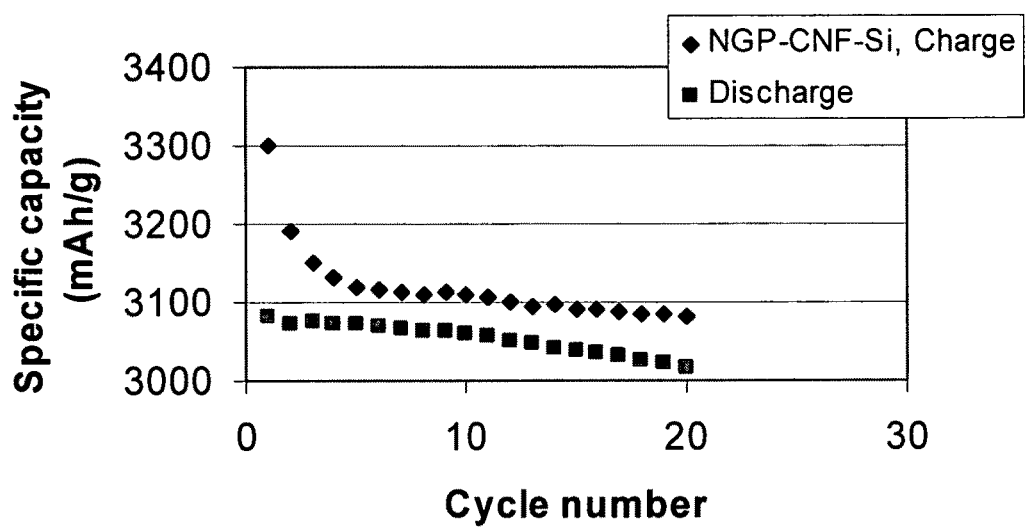
FIG. 11 Specific capacities of Sample NGP-CNF-Si (NGPs+CNFs being the conductive filaments and Si nanowires the anode active filaments) plotted as a function of the number of charge and discharge cycles.

FIG. 10 shows the results of a study on specific capacities of mixed NGP-Si nanowire filaments (Anode Sample NGP-Si prepared in Example 3). The specific capacities were plotted as a function of the number of charge and discharge cycles. Similarly, FIG. 11 shows specific capacities of a web of mixed NGP-CNT conductive filaments and Si nanowires (Anode Sample NGP-CNT-Si, prepared in Example 3) also plotted as a function of the number of charge and discharge cycles. It is of significance to note that an anode material featuring a mixed nano filament (containing 20-25% by weight NGP or NGP-CNF filaments) can exhibit a reversible specific capacity as high as 2,755-3,040 mAh/g (based on per unit gram of the mixed Si/CNF-NGP material). This is as high as 7-8 times the theoretical capacity of a graphite anode material.

Figure 12:
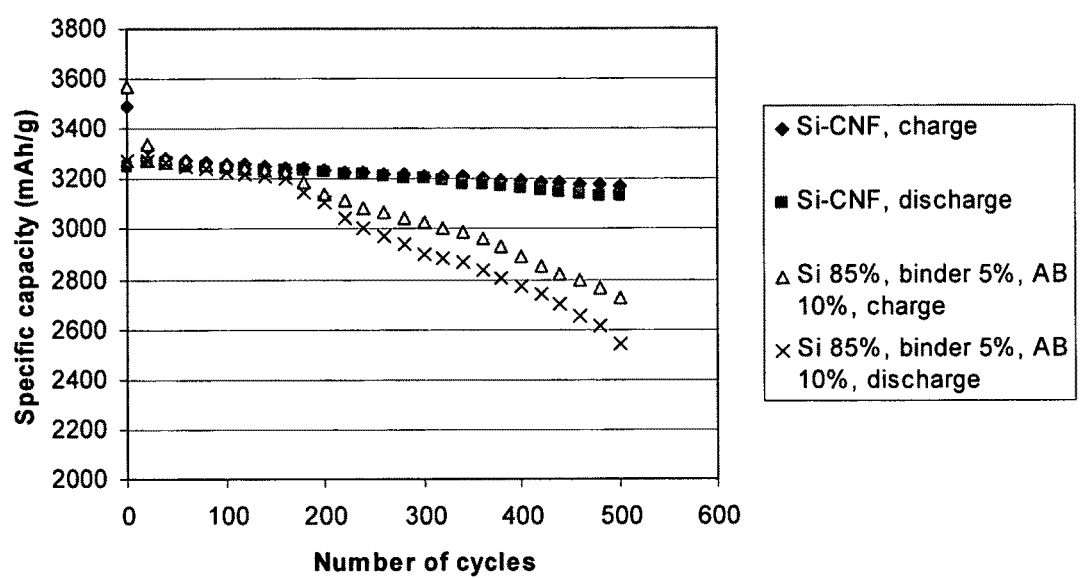
FIG. 12 Specific capacities of Sample Si-CNF (in situ grown CNFs being the conductive filaments and Si nanowires the anode active filaments) and a control sample (containing Si nanowires, a binder, and a conductive additive) plotted as a function of the number of charge and discharge cycles.

Shown in FIG. 12 are the specific capacities of Anode Sample Si-CNF (Si nanowires+in situ grown CNFs prepared in Example 6), in comparison with those of a control sample (containing 85% Si nanowires, 10% acetylene black, and 5% binder), all plotted as a function of the number of charge and discharge cycles. The reversible specific capacity for the anode featuring mixed nano filaments remains above 3,130 mAh/g even after 500 cycles. By contrast, the control sample shows a dramatic drop in capacities after 180 cycles possibly due to some breakage in Si nanowires and, hence, a loss of contact (or reduction in contact) with the current collector. The presence of conductive nano filaments, allowing multiple points of contact with a Si nanowire, appears to be an effective strategy in maintaining a good electrical connection. It may be noted that Chan, et al. [Ref. 21] only showed the data for their Si nanowire-based electrode (with a Si nanowire in contact with the current collector at only one point, one end of the nanowire) up to 10 cycles of charge-discharge. It was not clear how their electrode would respond to a larger number of cycles.

It may be further noted that the electrochemical responses of the presently invented hybrid nano material-based anodes are superior to those of amorphous, thin Si films (directly coated on a current collector) in terms of both a high reversible specific capacity and long cycle life, as reported in [Refs. 37-45]. Our anode materials perform the best in terms of reversible specific capacity, with only one exception [Ref. 45], in which Jung, et al. reported a high discharge capacity of approximately 4,000 mAh/g in one particular case. However, the capacity drops precipitously after 15 cycles in this case. An electrode with an electro-active material directly coated as a thin film (at most up to approximately 2 μm in thickness) on a surface of a current collector has another drawback in that there is a low specific capacity per unit area of the current collector. A lithium ion battery can only make use of the active material for up to a thin layer. Beyond 2 μm, the thin film has a high tendency to break up and lose contact with the current collector. In contrast, in the presently invented approach, there is no limitation on the amount of an electro-active material that can be used in a battery.

Figure 13:
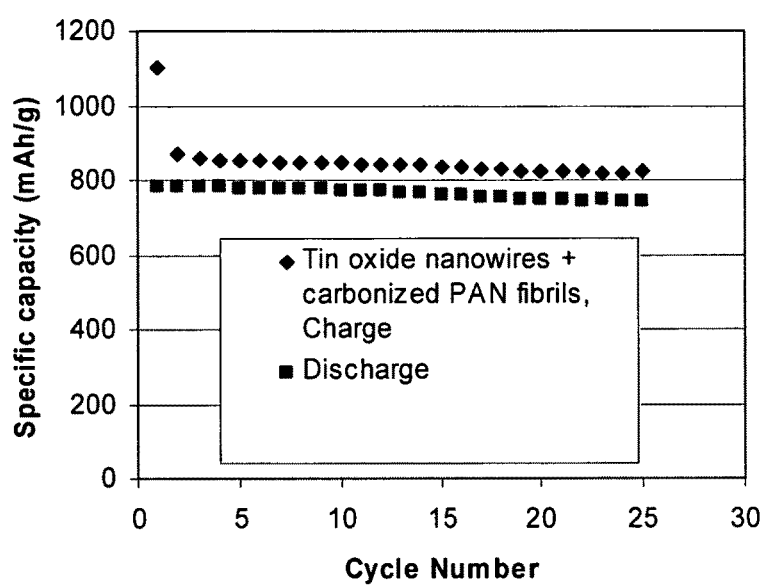
FIG. 13 Specific capacities of Anode Sample c-PAN—$SnO_2$ (a web of mixed carbonized nano fibrils and tin oxide nanowires) plotted as a function of the number of charge and discharge cycles.

FIG. 13 shows the specific capacities of Anode Sample c-PAN—$SnO_2$ (a web of mixed carbonized nano fibrils and tin oxide nanowires) plotted as a function of the number of charge and discharge cycles. The results are far better than the values reported for $SiO_2$-based anode systems in [Refs. 46-48].

Figure 14:
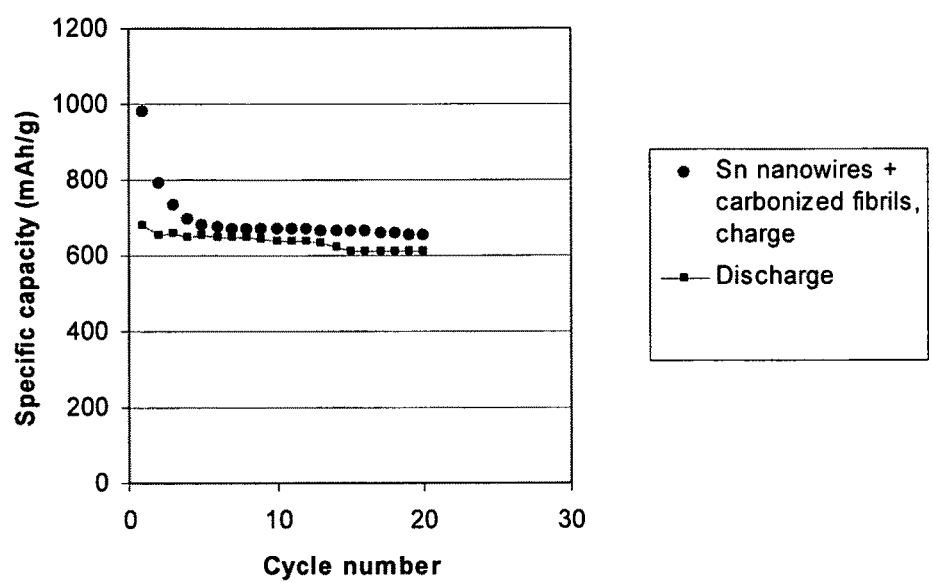
FIG. 14 Specific capacities of Anode Sample c-PI—Sn (a web of a mixture of carbonized fibrils and Sn nanowires) plotted as a function of the number of charge and discharge cycles.

The specific capacities of Anode Sample c-PI—Sn (a web of a mixture of carbonized fibrils and Sn nanowires) are plotted as a function of the number of charge and discharge cycles in FIG. 14. The results again are better than state-of-the-art Sn-based anodes [e.g., Ref. 49] in light of both a high reversible specific capacity and a long cycle life.

Figure 15:
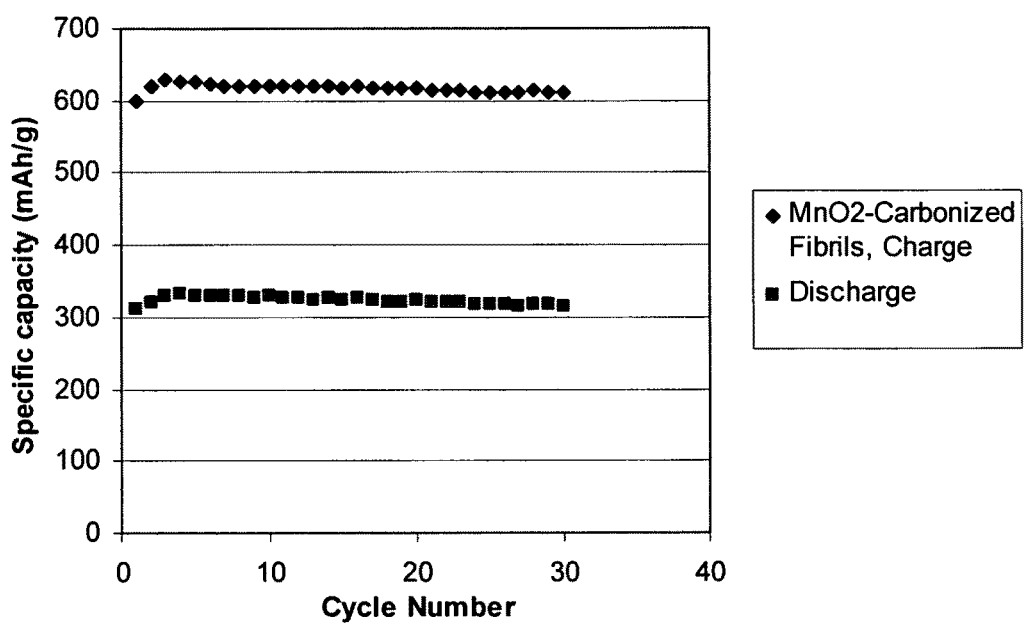
FIG. 15 Specific capacities of Cathode Sample $MnO_2$-c-PAN.

The specific capacities of Cathode Sample $MnO_2$-c-PAN were shown in FIG. 15. The cycling test was performed at a charging cut-off voltage of 4.0 V and a discharge current density of 0.1 $mA/cm^2$. There appears to have a high irreversibility, but the reason remains unclear. Despite this shortcoming, the specific reversible capacity even after 30 cycles remains relatively high, about 315 mAh/g, based on per gram of the total weight of mixed nano filaments. This is a very impressive value since the typical maximum specific capacity of a cathode material has been approximately 200 mAh/g.

Figure 16:
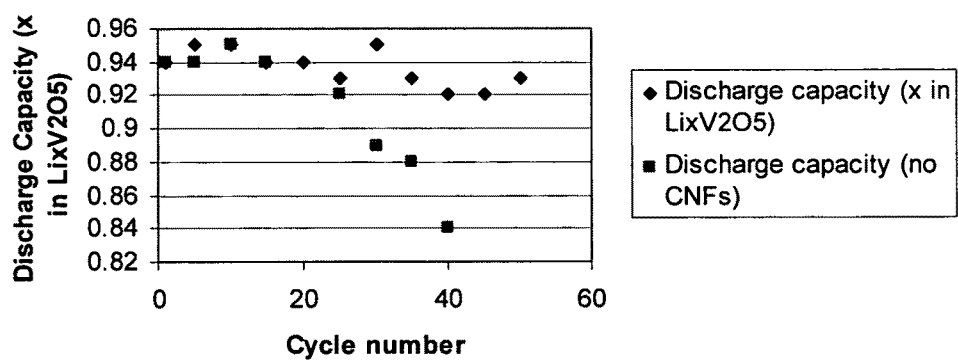
FIG. 16 Discharge specific capacities of Cathode Sample $V_2O_5$-CNF and its CNF-free counterpart.

The discharge specific capacities of Cathode Sample $V_2O_5$-CNF and its CNF-free counterpart were evaluated with cyclic voltammetry. These electrodes were cycled at a scan rate of 1.0 mV/s between the limits of 3.80 and 2.50 V. After each scan, the potential was held at 3.80 V until the current decayed to the first scan value. The data obtained are summarized in FIG. 16, in which the data are expressed in terms of the value x in $L_xV_2O_5$. After 50 complete cycles, the electrode from Cathode Sample $V_2O_5$-CNF (with CNFs grown in situ in the spaces between $V_2O_5$ nanowires) retained 98% of its first-cycle capacity. In contrast, the electrode of the control sample ($V_2O_5$ nanowires only, no CNFs) suffers an 11% reduction in capacity after just 40 cycles.

Figure 17:
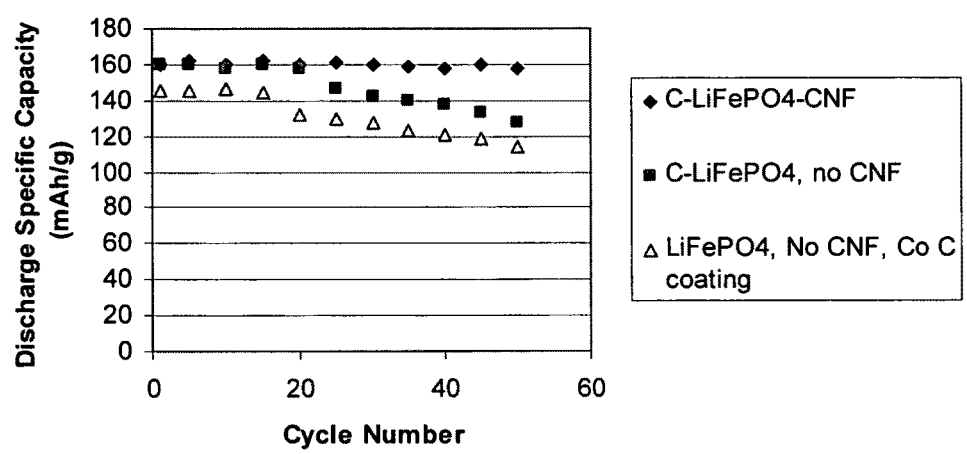
FIG. 17 Discharge capacities of Sample-$LiFePO_4$, Control Sample-$LiFePO_4$-1, and Control Sample-$LiFePO_4$-2.

The charge-discharge cycles of Sample-$LiFePO_4$, Control Sample-$LiFePO_4$-1, and Control Sample-$LiFePO_4$-2 were also studied using cyclic voltammetric experiments operated between 2.9 and 3.7 V, as well as AC impedance measurements. The results show a minimal resistive component in Sample-$LiFePO_4$ even after 50 complete cycles, indicating its ability to maintain a network of electron-conductive paths. This sample also maintains a relatively high reversible discharge capacity after 50 cycles conducted at a high discharge rate of 5 C (FIG. 17). In contrast, both control samples exhibit significant capacity decay after 23 and 16 cycles, respectively.

In summary, the present invention provides an innovative, versatile platform materials technology that enables the design and manufacture of superior anode and cathode materials for lithium ion batteries or other types of rechargeable batteries. This new technology has the following main advantages:

(1) The approach of using highly conductive, nano-scaled filaments (nanometer-scale diameter or thickness) to support electrode active material filaments (nanowires) proves to be a superior strategy, which is applicable to a wide range of nanowires materials that have a high Li-absorbing capacity. The nanowires seem capable of freely undergoing strain relaxation in transverse directions during lithium ion insertion and extraction. During these repeated volume changes, the network of conductive filaments ensures the continuity of electron-conducting paths with respect to a current collector. The nanowires do not lose their electrical connection with the current collector during repeated charge/discharge cycles. This has proven to be a robust configuration.

(2) With the electro-active filament diameter less than 500 nm (thinner than 100 nm in many cases), the distance that lithium ions have to travel is short. The anode can quickly store or release lithium and thus can carry high currents. This high-rate performance is a highly beneficial feature for a battery that is intended for high power density applications such as electric cars.

(3) The interconnected network of filaments forms a continuous path for electrons, resulting in significantly reduced internal energy loss or internal heating.

(4) This approach is applicable to both the anode and the cathode. The anode material in the present invention provides an exceptionally high reversible specific capacity. Even when the weight of the filaments is accounted for, the maximum capacity can still be exceptionally high since only a small fraction of conductive filaments is needed. A specific capacity as high as 3,400 mAh/g (based on per gram of the mixed filaments) can be achieved. This is still 9 times higher than the theoretical specific capacity of 372 mAh/g for the graphite anode material. Furthermore, the Li ion batteries featuring the presently invented mixed nano filament-based electrode material exhibit superior multiple-cycle behaviors with only a small capacity fade and a long cycle life.

The invention claimed is:

1. An electrochemical cell electrode comprising a mixed nano-filament composition, said composition comprising an aggregate of:
   a) nanometer-scaled, electrically conductive filaments that are interconnected, intersected, or percolated to form a porous, electrically conductive filament network, wherein said filaments have a length and a diameter or thickness, and the diameter or thickness is less than 500 nm with a length-to-diameter or length-to-thickness aspect ratio greater than 10 and said conductive filaments are selected from nano-scaled graphene platelets with a length-to-width ratio greater than 3, metal nano wires, metal-coated fibrils, and combinations thereof; and
   b) multiple nanometer-scaled, electro-active filaments comprising therein or thereon an electro-active material capable of absorbing and desorbing lithium ions wherein said electro-active filaments have a diameter or thickness less than 500 nm; wherein the electro-active filaments comprise an active material selected from the group consisting of:
      a) silicon (Si), germanium (Ge), lead (Pb), antimony (Sb), bismuth (Bi), zinc (Zn), aluminum (Al), and cadmium (Cd);
      b) alloys or intermetallic compounds of Si, Ge, Pb, Sb, Bi, Zn, Al, or Cd with other elements, wherein said alloys or compounds are stoichiometric or non-stoichiometric;
      c) oxides, carbides, nitrides, sulfides, phosphides, selenides, and tellurides of Si, Ge, Pb, Sb, Bi, Zn, Al, Fe, or Cd, and their mixtures or composites; and
      d) combinations thereof; and
   wherein said electro-active filaments and said electrically conductive filaments are intertwined to form a mat, web, or porous paper structure in which at least an electro-active filament is in electrical contact with at least an electrically conductive filament.

2. The mixed nano-filament composition of claim 1 wherein said electrically conductive filaments have a diameter or thickness smaller than 100 nm or said electro-active filaments have a diameter or thickness smaller than 100 nm.

3. The mixed nano-filament composition of claim 1 wherein said electro-active filaments comprise nanowires and at least an electro-active filament is in electrical contact with electrically conductive filaments at multiple contact points.

4. The mixed nano-filament composition of claim 1 wherein said electrically conductive filaments comprise nano-scaled graphene platelets with a thickness less than 10 nm.

5. The mixed nano-filament composition of claim 1 wherein said electro-active filaments comprise a nanowire selected from the group consisting of nanowires of Ge, Si, their oxides, carbides, nitrides, sulfides, phosphides, selenides, and tellurides, and combinations thereof.

6. The mixed nano-filament composition of claim 4 wherein said electro-active filaments comprise Si nanowires.

7. The mixed nano-filament composition of claim 5 wherein said electro-active filaments comprise Si nanowires.

8. The mixed nano-filament composition of claim 1 wherein the electro-active filaments comprise an element selected from Si, Ge, Sb, or a combination thereof.

9. The mixed nano-filament composition of claim 3 wherein the nanowires are amorphous or comprise nano crystallites.

10. A lithium secondary battery comprising a positive electrode (cathode), a negative electrode (anode) comprising a mixed nano-filament composition as defined in claim 1 which is capable of absorbing and desorbing lithium ions, and a non-aqueous electrolyte disposed between said negative electrode and said positive electrode.

11. A lithium secondary battery comprising a positive electrode, a negative electrode comprising a mixed nano-filament composition as defined in claim 2 which is capable of absorbing and desorbing lithium ions, and a non-aqueous electrolyte disposed between said negative electrode and said positive electrode.

12. A lithium secondary battery comprising a positive electrode, a negative electrode comprising a mixed nano-filament composition as defined in claim 3 which is capable of absorbing and desorbing lithium ions, and a non-aqueous electrolyte disposed between said negative electrode and said positive electrode.

13. The lithium secondary battery according to claim 10, wherein said positive electrode comprises lithium cobalt oxide, lithium nickel oxide, lithium manganese oxide, lithium iron phosphate, lithium vanadium oxide, lithium vanadium phosphate, or a combination thereof.

14. The lithium secondary battery as defined in claim 10 wherein said mixed nano-filament composition further comprises a binder material selected from a polymer, coal tar pitch, petroleum pitch, meso-phase pitch, coke, or a derivative thereof.

15. The lithium secondary battery as defined in claim 10, wherein said mixed nano-filament composition provides a specific capacity of no less than 1,000 mAh per gram of anode material weight.

16. The lithium secondary battery as defined in claim 10, wherein said mixed nano-filament composition provides a specific capacity of no less than 2,000 mAh per gram of anode material weight.

17. The lithium secondary battery as defined in claim 10, wherein said mixed nano-filament composition provides a specific capacity of no less than 3,000 mAh per gram of anode material weight.

18. The lithium secondary battery as defined in claim 11, wherein said mixed nano-filament composition provides a specific capacity of no less than 2,000 mAh per gram of anode material weight.

19. The lithium secondary battery as defined in claim 12, wherein said mixed nano-filament composition provides a specific capacity of no less than 3,000 mAh per gram of anode material weight.

20. A lithium secondary battery comprising a negative electrode, a positive electrode comprising a mixed nano-filament composition as defined in claim 1 which comprises a cathode active filament capable of absorbing and desorbing lithium ions, and a non-aqueous electrolyte disposed between said negative electrode and said positive electrode.

21. A lithium secondary battery comprising a negative electrode, a positive electrode comprising a mixed nano-filament composition as defined in claim 2 which comprises a cathode active filament capable of absorbing and desorbing lithium ions, and a non-aqueous electrolyte disposed between said negative electrode and said positive electrode.

22. A lithium secondary battery comprising a negative electrode, a positive electrode comprising a mixed nano-filament composition as defined in claim 3 which comprises a cathode active filament capable of absorbing and desorbing lithium ions, and a non-aqueous electrolyte disposed between said negative electrode and said positive electrode.

23. A lithium secondary battery of claim 20 wherein said mixed nano-filament composition provides a discharge specific capacity greater than 200 mAh/g, based on per gram of cathode material weight.

24. A lithium secondary battery comprising:
a) a negative electrode comprising a mixed nano-filament composition as defined in claim 1 which comprises an anode active filament capable of absorbing and desorbing lithium ions during charging and recharging of said battery;
b) a positive electrode comprising a mixed nano-filament composition as defined in claim 1 which comprises a cathode active filament capable of desorbing and absorbing lithium ions during charging and recharging of said battery; and
c) a non-aqueous electrolyte disposed between said negative electrode and said positive electrode.

* * * * *